US009523552B2

(12) United States Patent
Eitan

(10) Patent No.: US 9,523,552 B2
(45) Date of Patent: Dec. 20, 2016

(54) ANTI-ROTATIONAL QUICK DISCONNECT MOUNT FOR A FIREARM

(71) Applicant: Magpul Industries Corp, Boulder, CO (US)

(72) Inventor: Yehezkel Eitan, Johnstown, CO (US)

(73) Assignee: MAGPUL INDUSTRIES CORP., Austin, TX (US)

( * ) Notice: Subject to any disclaimer, the term of this patent is extended or adjusted under 35 U.S.C. 154(b) by 0 days.

(21) Appl. No.: 14/753,555

(22) Filed: Jun. 29, 2015

(65) Prior Publication Data
US 2016/0327362 A1 Nov. 10, 2016

Related U.S. Application Data

(63) Continuation-in-part of application No. 14/703,285, filed on May 4, 2015.

(51) Int. Cl.
*F41C 27/00* (2006.01)
*F41C 23/02* (2006.01)

(52) U.S. Cl.
CPC .............. *F41C 27/00* (2013.01); *F41C 23/02* (2013.01)

(58) Field of Classification Search
CPC ............... F16B 5/0208; F16B 21/06–21/078; F16B 39/28; F16B 39/282; F16B 21/02; A44B 17/0076; F41C 27/00; F41C 23/02; Y10T 24/45602–24/45874
See application file for complete search history.

(56) References Cited

U.S. PATENT DOCUMENTS

| 2,480,662 | A |   | 8/1949 | Preston |
| 2,523,241 | A | * | 9/1950 | Buren, Jr. .......... A44B 17/0011 24/673 |
| 2,642,689 | A |   | 7/1953 | Cline |
| 2,679,707 | A |   | 6/1954 | Merlino |

(Continued)

FOREIGN PATENT DOCUMENTS

| DE | 102005022278 A1 * | 11/2006 | ............ F16B 5/0657 |
| DE | 102008019229 A1 | 8/2009 | |

(Continued)

OTHER PUBLICATIONS

Magpul Industries Corp., "UBR Collapsible Stock", Webpage found at https://www.magpul.com/products/ubr%C2%AE-collapsible-stock Inventor(s) aware of prior art on or before May 26, 2015, p. 4 Published in: US.

(Continued)

*Primary Examiner* — Stephen M Johnson
*Assistant Examiner* — Joshua Semick
(74) *Attorney, Agent, or Firm* — Neugeboren O'Dowd PC

(57) ABSTRACT

An anti-rotational quick disconnect socket system for a firearm is disclosed. The system has an anti-rotational quick disconnect socket (QD socket) and a recess in a housing of a firearm. The recess is shaped to slidingly receive and seat the socket, and has a protrusion extending inwardly from the outer confines of the recess. The socket has a proximal end with a socket entry, a distal end, and a brace extending therebetween. The protrusion is engaged with the first brace to prevent rotation of the socket relative to the recess. The system has a gap between a proximal surface of the first protrusion and a distal surface of the socket entry.

13 Claims, 32 Drawing Sheets

(56) References Cited

U.S. PATENT DOCUMENTS

| | | | | |
|---|---|---|---|---|
| 2,767,454 | A | * | 10/1956 | Johnson ............ A44B 17/0011 24/662 |
| 2,771,699 | A | | 11/1956 | Herter |
| 3,061,965 | A | | 11/1962 | Lewis |
| 3,066,375 | A | | 12/1962 | Belding et al. |
| 3,109,214 | A | * | 11/1963 | Clay .................... F16B 5/0208 411/349 |
| 3,121,453 | A | * | 2/1964 | Modrey ............... F16B 5/0208 411/103 |
| 3,226,872 | A | | 1/1966 | Pachmayr |
| 3,683,988 | A | * | 8/1972 | Carter .................. F16B 5/0208 411/105 |
| 4,285,380 | A | * | 8/1981 | Gulistan .............. F16B 5/0208 411/103 |
| 4,327,626 | A | | 5/1982 | McQueen |
| 4,663,877 | A | | 5/1987 | Bragg |
| 4,685,237 | A | * | 8/1987 | Hugg .................... F41C 23/02 224/156 |
| 4,924,549 | A | * | 5/1990 | Morel .................... E05F 5/022 16/82 |
| 5,305,539 | A | | 4/1994 | Von Kuster |
| 5,367,812 | A | | 11/1994 | Lautrec |
| 5,410,833 | A | | 5/1995 | Paterson |
| 5,580,204 | A | * | 12/1996 | Hultman ................ F16B 5/065 24/297 |
| 5,615,462 | A | | 4/1997 | Goto |
| 5,845,377 | A | | 12/1998 | Bibeault |
| 5,970,642 | A | | 10/1999 | Martin |
| 6,560,911 | B2 | | 5/2003 | Sharp |
| 6,765,148 | B2 | * | 7/2004 | Rix ....................... F16B 5/0642 16/2.2 |
| 6,955,514 | B2 | * | 10/2005 | Hoshi .................... F16B 5/065 24/297 |
| 7,162,822 | B1 | | 1/2007 | Heayn et al. |
| 7,398,616 | B1 | | 7/2008 | Weir |
| 7,428,794 | B2 | | 9/2008 | Oz |
| 7,610,711 | B2 | | 11/2009 | Oz |
| 7,640,690 | B2 | | 1/2010 | Hines |
| 7,654,027 | B1 | | 2/2010 | Grover |
| 7,930,849 | B2 | | 4/2011 | Abraham et al. |
| 7,937,873 | B2 | | 5/2011 | Keng |
| 7,966,760 | B2 | | 6/2011 | Fitzpatrick et al. |
| 7,984,580 | B1 | | 7/2011 | Giauque et al. |
| 8,007,029 | B2 | * | 8/2011 | Sano .................... B62D 27/065 296/180.1 |
| 8,061,072 | B1 | | 11/2011 | Crose |
| 8,087,193 | B2 | | 1/2012 | Kincel |
| 8,127,483 | B2 | | 3/2012 | Kincel |
| 8,186,090 | B1 | | 5/2012 | Chiarolanza et al. |
| 8,191,299 | B2 | | 6/2012 | Faifer |
| 8,327,569 | B2 | | 12/2012 | Kincel |
| 8,341,867 | B2 | | 1/2013 | Criswell |
| 8,381,427 | B2 | | 2/2013 | Nill |
| 8,387,298 | B2 | | 3/2013 | Kincel |
| 8,464,458 | B2 | | 6/2013 | Chvala |
| 8,656,622 | B2 | | 2/2014 | Peterson et al. |
| 8,684,321 | B2 | * | 4/2014 | Shirakabe ........... F16B 37/0842 24/297 |
| 8,720,099 | B1 | | 5/2014 | Sisk |
| 8,756,849 | B2 | | 6/2014 | Troy |
| 8,769,855 | B2 | | 7/2014 | Law |
| 8,832,986 | B2 | | 9/2014 | Mayberry et al. |
| 9,033,632 | B2 | * | 5/2015 | Komsitsky ........... F16B 5/0208 411/182 |
| 9,127,701 | B2 | * | 9/2015 | Tung ..................... F16B 2/065 |
| 2010/0111642 | A1 | * | 5/2010 | Matsuno ............ F16B 37/0857 411/508 |
| 2010/0205846 | A1 | | 8/2010 | Fitzpatrick et al. |
| 2011/0239512 | A1 | | 10/2011 | Kleven |
| 2014/0190055 | A1 | | 7/2014 | Warburton |

FOREIGN PATENT DOCUMENTS

| | | | |
|---|---|---|---|
| EP | 1751488 A1 | 2/2007 | |
| GB | 242588 A | * 12/1925 | ............ F16B 21/06 |

OTHER PUBLICATIONS

Magpul Industries Corp., "MSS—Install and Usage M93 Carbine Stock", Webpage found at http://www.thewilderness.com/pdf_infosheets/M93stock_instructions.pdf Inventor(s) aware of prior art on or before May 26, 2015, p. 20 Published in: US.

Magpul Industries Corp., "MS1 MS4 Adapter", Webpage found at https://www.magpul.com/products/msl-ms4-adapter Inventor(s) aware of prior art on or before Jul. 13, 2015, p. 4 Published in: US.

Magpul Industries Corp., "MS4 Dual QD Sling Gen 2", Webpage found at https://www.magpul.com/products/ms4-dual-qd-sling-gen-2 Inventor(s) aware of prior art on or before May 26, 2015, p. 4 Published in: US.

Magpul Industries Corp., "MSA QD-MOE Sling Attachment QD", Webpage found at https://www.magpul.com/products/msa-qd Inventor(s) aware of prior art on or before Jul. 13, 2015, p. 4, Published in: US.

Daniel Defense, "Rail Mount QD Swivel Attachment Point w/Swivel", Webpage found at https://danieldefense.com/mounts/sling/rail-mount-qd-swive-attachment-point-w-swivel.html Inventor(s) aware of prior art on or before Jul. 13, 2015, p. 1, Published in: US.

Magpul Industries Corp., "RSA QD-Rail Sling Attachment QD", Webpage found at https://www.magpul.com/products/rsa-qd Inventor(s) aware of prior art on or before Jul. 13, 2015, p. 4, Published in: US.

Magpul Industries Corp., "Magpul Sling Mount Kit—Type 1", Webpage found at https://www.magpul.com/products/sling-mount-kit-type-1 Inventor(s) aware of prior art on or before Jul. 13, 2015, p. 4, Published in: US.

Magpul Industries Corp., "Magpul Sling Mount—Type 2", Webpage found at https://www.magpul.com/products/sling-mount-kit-type-2 Inventor(s) aware of prior art on or before Jul. 13, 2015, p. 4, Published in: US.

Blackhawk, "Blackhawk 71SS00BK Hard Push Button Sling Swivel", Webpage found at http://clarksvillegunsandarchery.com/bh-hard-push-button-sling-swivel-blk.html downloaded on Oct. 13, 2015, p. 2 Published in: US.

CAA, "CAA Heavy Duty Push Button Sling Swivel", Webpage found at http://www.lapolicegear.com/ema-pbss-sling-swivel.html downloaded on Oct. 13, 2015, p. 4 Published in: US.

Young, Lee W., "International Search Report and Written Opinion re Application No. PCT/US16/29612", Oct. 5, 2016, p. 15, Published in: US.

Midway USA, "GrovTech Heavy Duty Push Button Sling Swivel Base Non-Rotating Steel Package of 2", "Retrieved from http://www.midwayusa.com/product/314136/grovtech-heavy-duty-push-button-s;omg-swivel-base-non-rotating-steel-package-of-2", Feb. 3, 2015, p. 2.

* cited by examiner

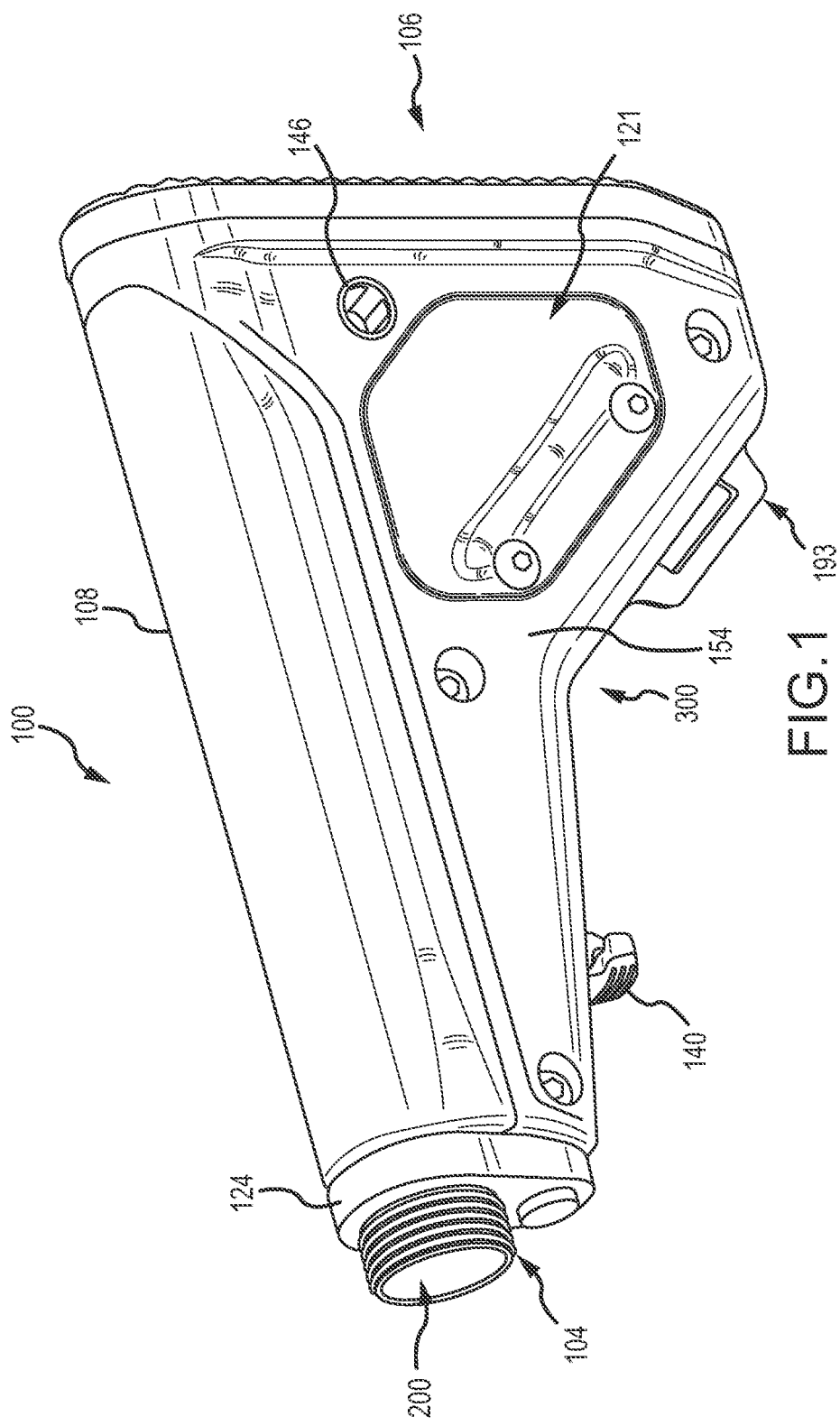

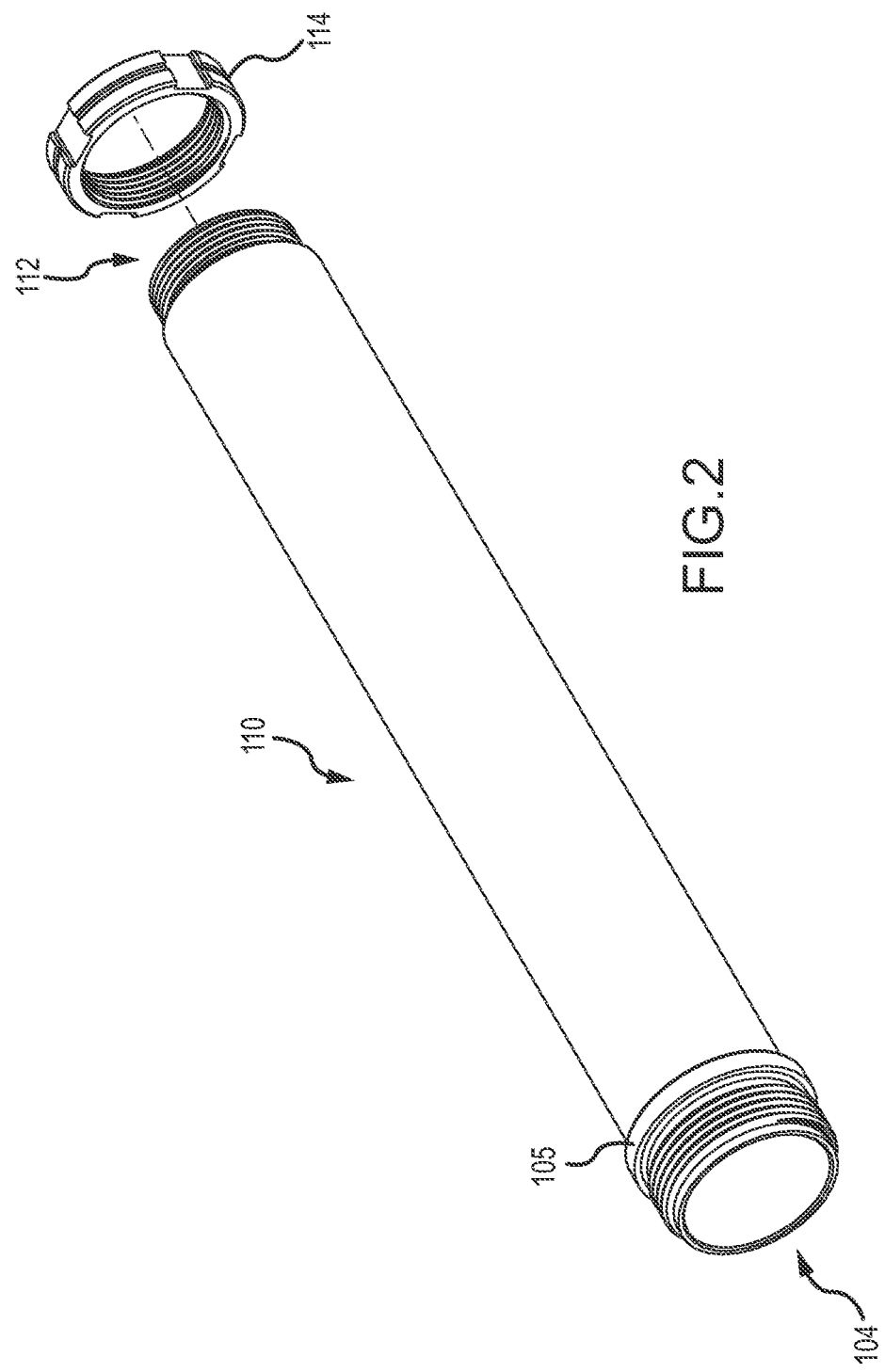

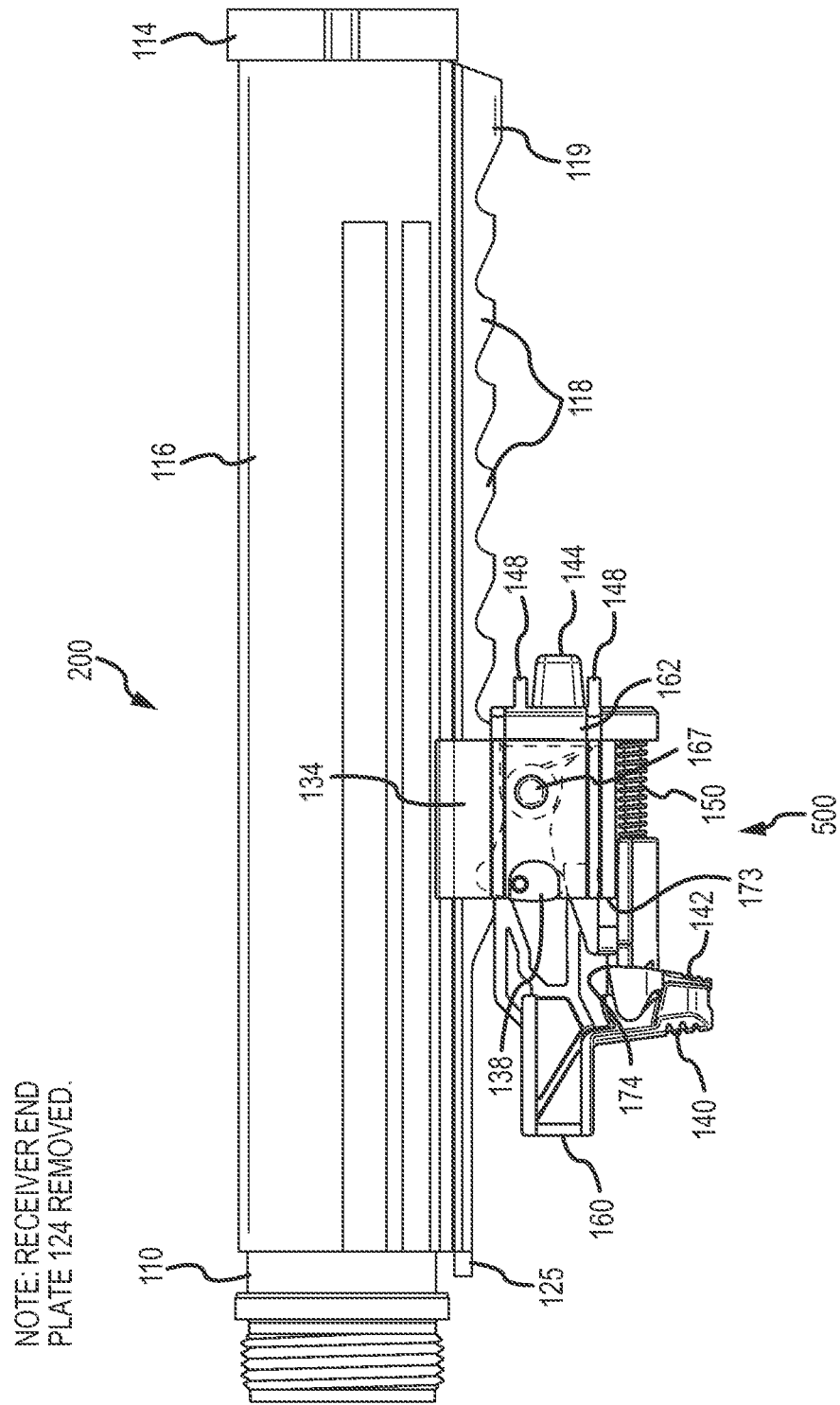

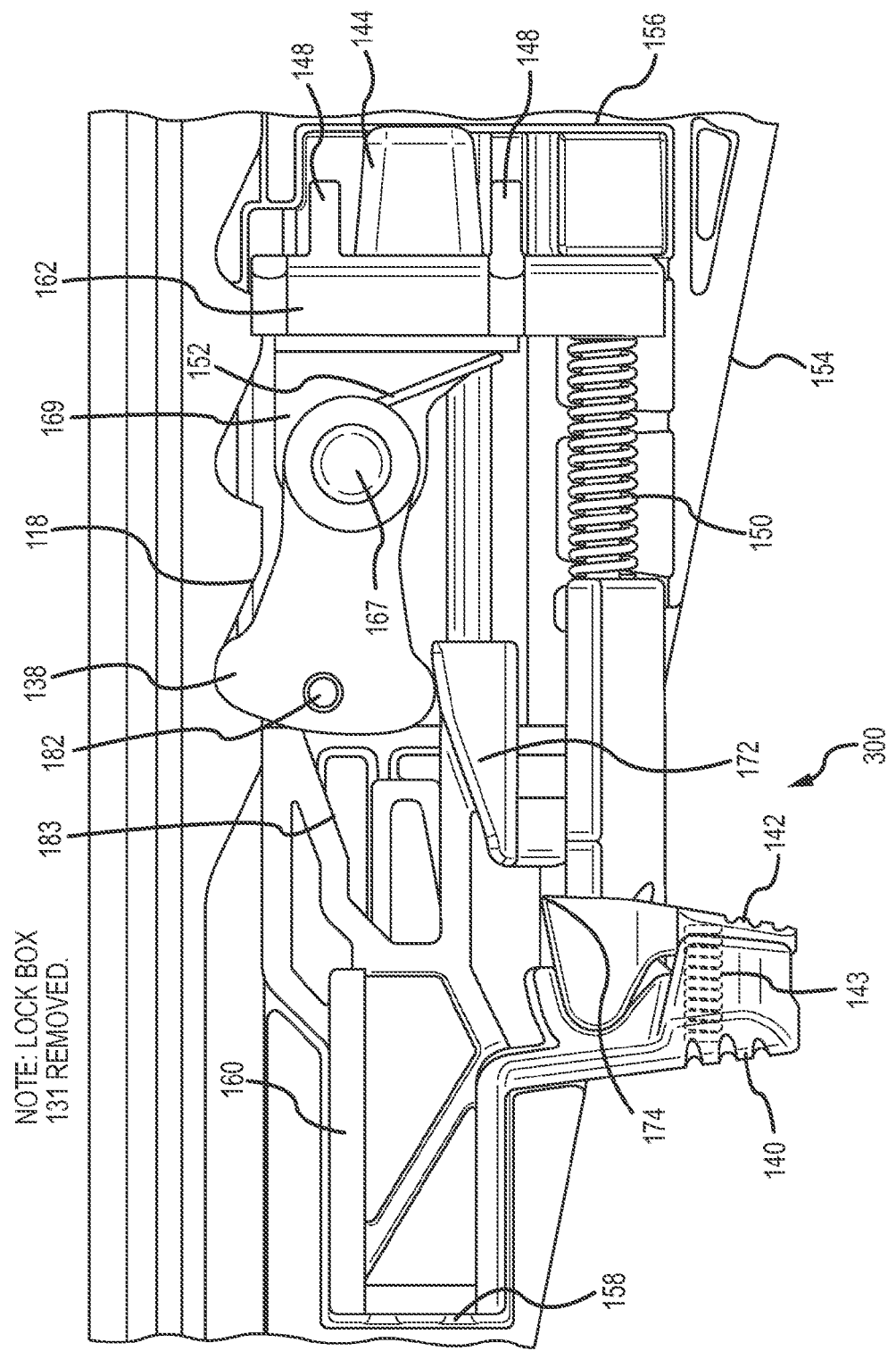

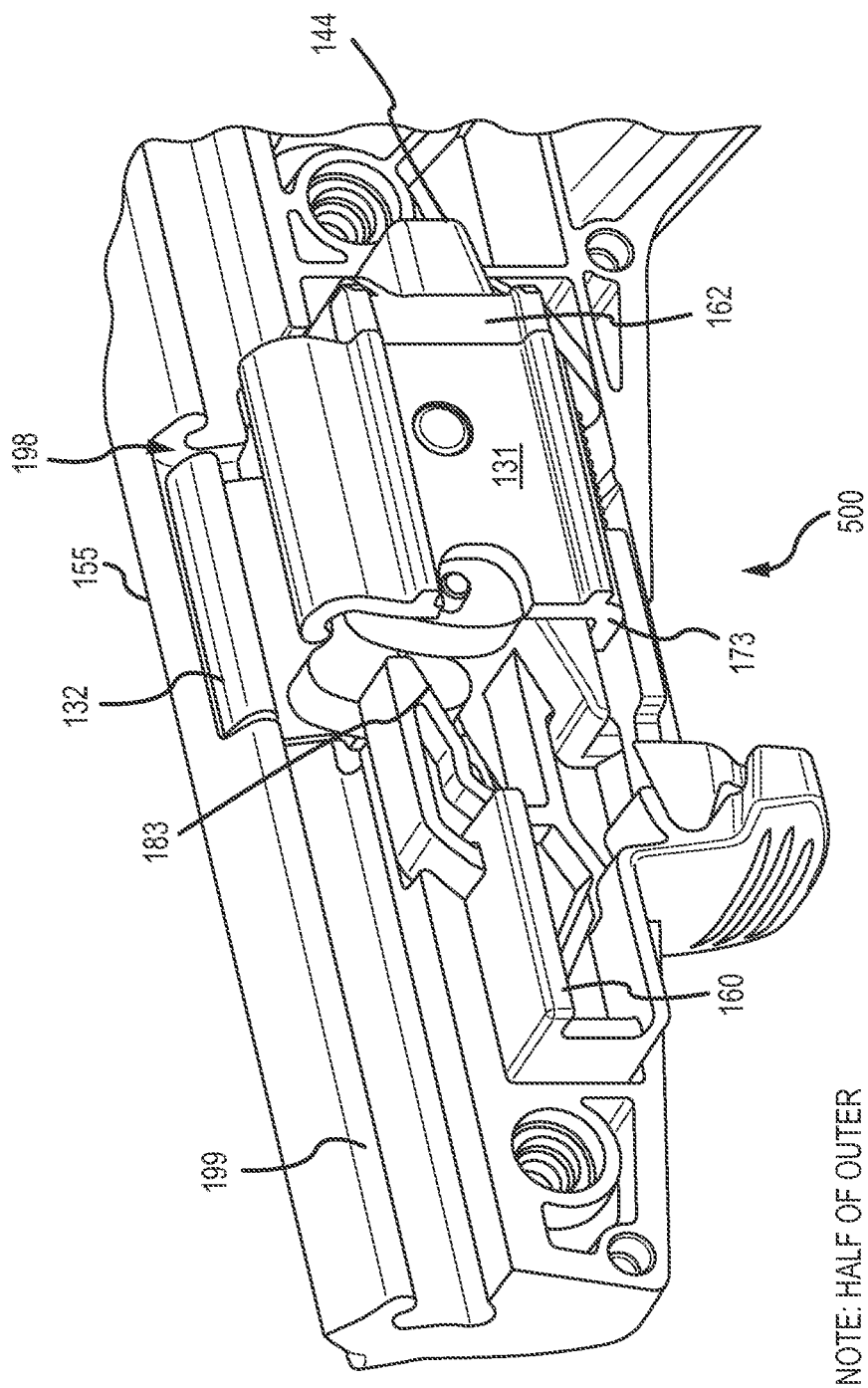

ANTI-ROTATIONAL QUICK DISCONNECT MOUNT FOR A FIREARM

CROSS-REFERENCE TO RELATED APPLICATIONS

This application is a continuation-in-part of U.S. application Ser. No. 14/703,285 filed May 4, 2015 and entitled "Stock Assembly," the entire disclosure of which is hereby incorporated by reference for all proper purposes, as if fully set forth herein.

BACKGROUND

Field

The present invention relates generally to firearms, and more specifically to firearm stock assemblies.

Background

Firearms that are designed to be braced by a shoulder generally include a stock to provide this support. It is common in the industry for users to replace the stock with one that is more suitable to the users' needs, such as to give flexibility in adjusting a length of pull. However, currently-available replacement stocks may cause the weapon to be unsuitably inaccurate due to loose tolerance standards and/or may cause the weapon to be heavy, loose and/or weak, and/or have insufficient drop strength.

In some currently-available firearms, a receiver extension is provided which includes a keyed slot into which another part fits, and a protrusion or rail along the bottom to allow locking positions for stocks that are adjustable in length. In some currently-available designs, a castle nut is required to tighten an end plate and lock the receiver extension to the receiver. It may be difficult to access the receiver in some cases.

Another feature of some currently-available designs is that they comprise three components: a receiver extension, an end cap to an interface, and a screw fastener.

Finally, it is desirable to provide a stock assembly that provides greater bending strength and rigidity, improved firing accuracy, an improved drop strength, a reduced parts count, and/or a reduced weight, as compared to currently-available designs and/or other new and innovative features.

SUMMARY

Some embodiments described below address the above stated needs by providing a stock assembly having some of the aspects described herein.

In some aspects, an anti-rotational quick disconnect socket for a firearm is provided. The socket has a proximal end and a distal end, and a first brace extending between the proximal end and the distal end. The proximal end has a socket entry and a quick disconnect lip. The distal end has a socket base having a fastening means and a radial region having a first recess. The first brace is positioned at a first radial position, and the first recess is positioned at a second radial position, the second radial position different from the first radial position.

In some aspects, a housing for a firearm is provided. The housing has a wall with a recess shaped therein. The recess has outer confines and a depth extending from a proximal entry to a distal surface. The recess also has a first protrusion extending inwardly from the outer confines and having a length that is less than the depth of the outer confines. The proximal entry is a recess extending to a proximal surface of the first protrusion. The distal surface is shaped to seat a socket base of a quick disconnect socket and comprises a receiving means. The first protrusion is shaped to slidingly engage a first brace of the quick disconnect socket and prevent rotation of the quick disconnect socket relative to the first protrusion.

In some aspects, an anti-rotational quick disconnect socket system for a firearm is provided. The system has an anti-rotational quick disconnect socket and a recess in a housing of a firearm. The socket has outer confines having a proximal end, a distal end, and a first brace extending therebetween, the proximal end having a socket entry with a quick disconnect lip. The recess is shaped to slidingly receive and seat the socket, and has outer confines and a depth extending from a recess entry to a distal surface. The recess also has a first protrusion extending inwardly from the outer confines. The first protrusion may be engaged with the first brace to prevent rotation of the socket relative to the recess. The system has a gap between a proximal surface of the first protrusion and a distal surface of the socket entry.

BRIEF DESCRIPTION OF THE DRAWINGS

FIG. 1 is a perspective view of an exemplary stock assembly illustrating some aspects;

FIG. 2 is a perspective view of an exemplary receiver extension and nut;

FIG. 5A is a side view of an exemplary lock assembly attached to an exemplary tube assembly;

FIG. 5B is a detailed side view illustrating the lock assembly in FIG. 5 interfacing with a tube assembly;

FIG. 5I is a perspective view illustrating the lock assembly in FIG. 5 interfacing with a body of a stock;

FIG. 7I is a side section view illustrating an exemplary QD socket installed in a wall of an object;

DETAILED DESCRIPTION

Figure 1A:
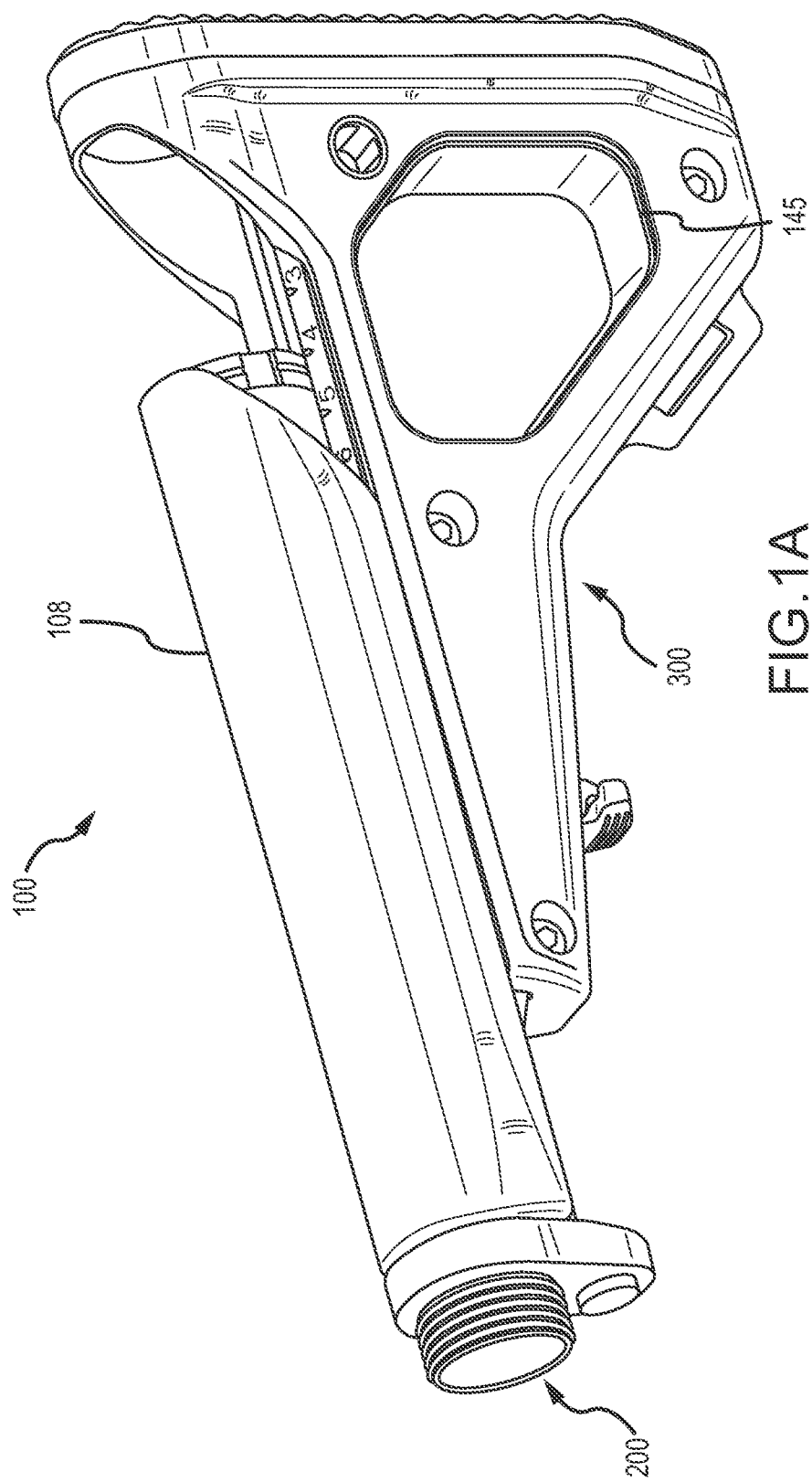
FIG. 1A is a perspective view of the stock assembly in FIG. 1, in an extended configuration and without a storage compartment.

With initial reference to FIG. 1, an exemplary stock assembly 100 according to some embodiments is now described in detail. By way of introduction, the stock assembly 100 may be a stock assembly 100 that enables a user or manufacturer to easily align and attach the stock assembly 100 and/or components thereof to a firearm. The stock assembly 100 may provide an end user with the ability to adjust the overall length of the stock assembly 100, an improved manner for disassembling a portion or all of the stock assembly, and/or an improved ability to connect accessories (e.g. an improved Quick Disconnect or QD socket). It should be understood that the word "exemplary" is used herein to mean "serving as an example, instance, or illustration." Any embodiment described herein as "exemplary" is not necessarily to be construed as preferred or advantageous over other embodiments.

The stock assembly 100 may include a receiver extension assembly 200 having a threaded receiver interface 104, and a lower stock assembly 300. The stock assembly 100 may also include a butt pad 106 substantially opposing the threaded receiver interface 104, a removable cheek piece 108, and an outer stock body 154. A quick disconnect socket, or QD socket 146, may be provided as a feature in the stock assembly 100. A receiver end plate 124 may provide an alignment feature between the stock assembly 100 and a firearm. A grip 140 may provide a user with the ability to adjust the overall length of the stock assembly 100, so that the stock/firearm can be adjusted for different users.

Figure 1B:
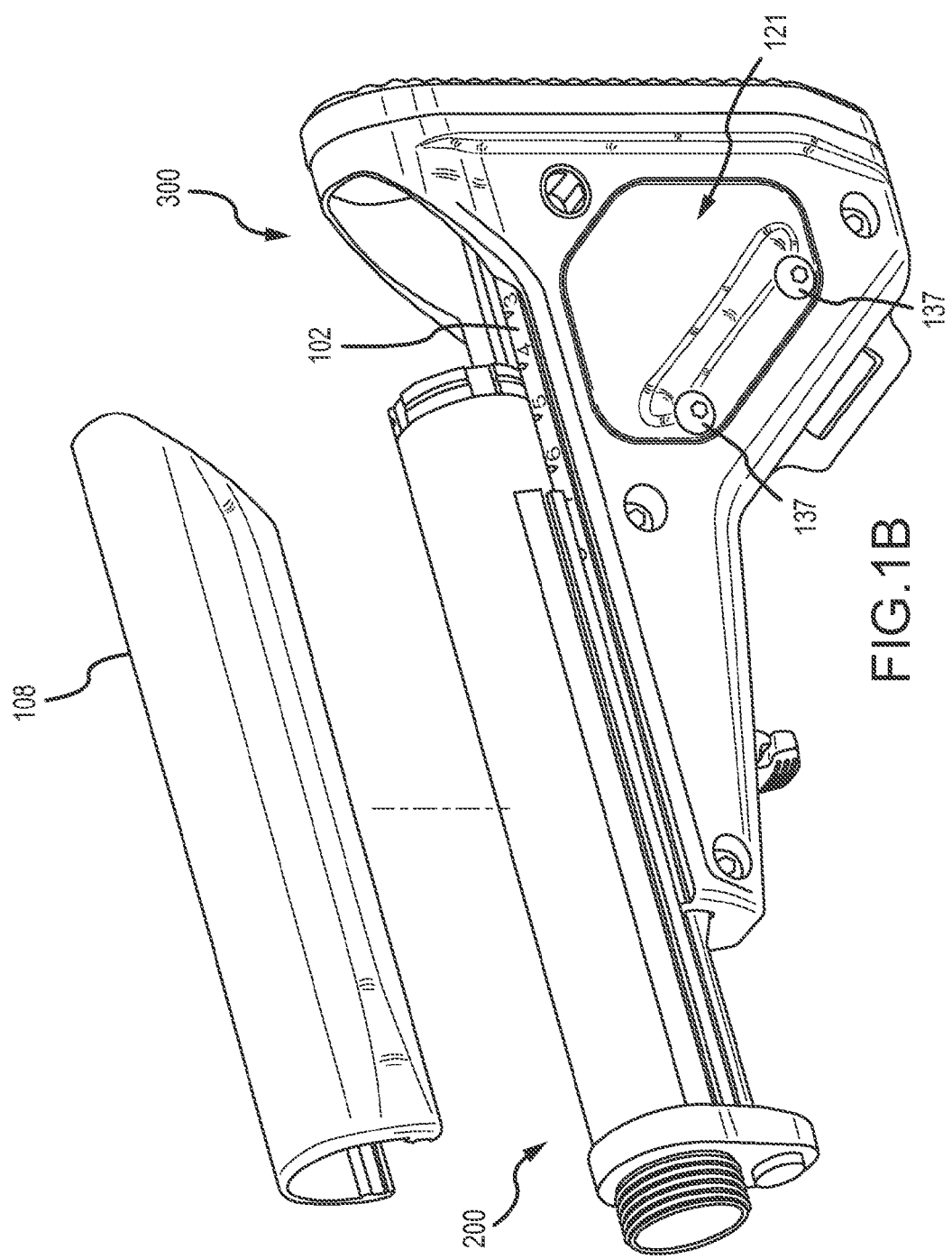
FIG. 1B is a perspective view of the stock assembly in FIG. 1, extended and with a cheek piece disassembled.
Figure 1C:
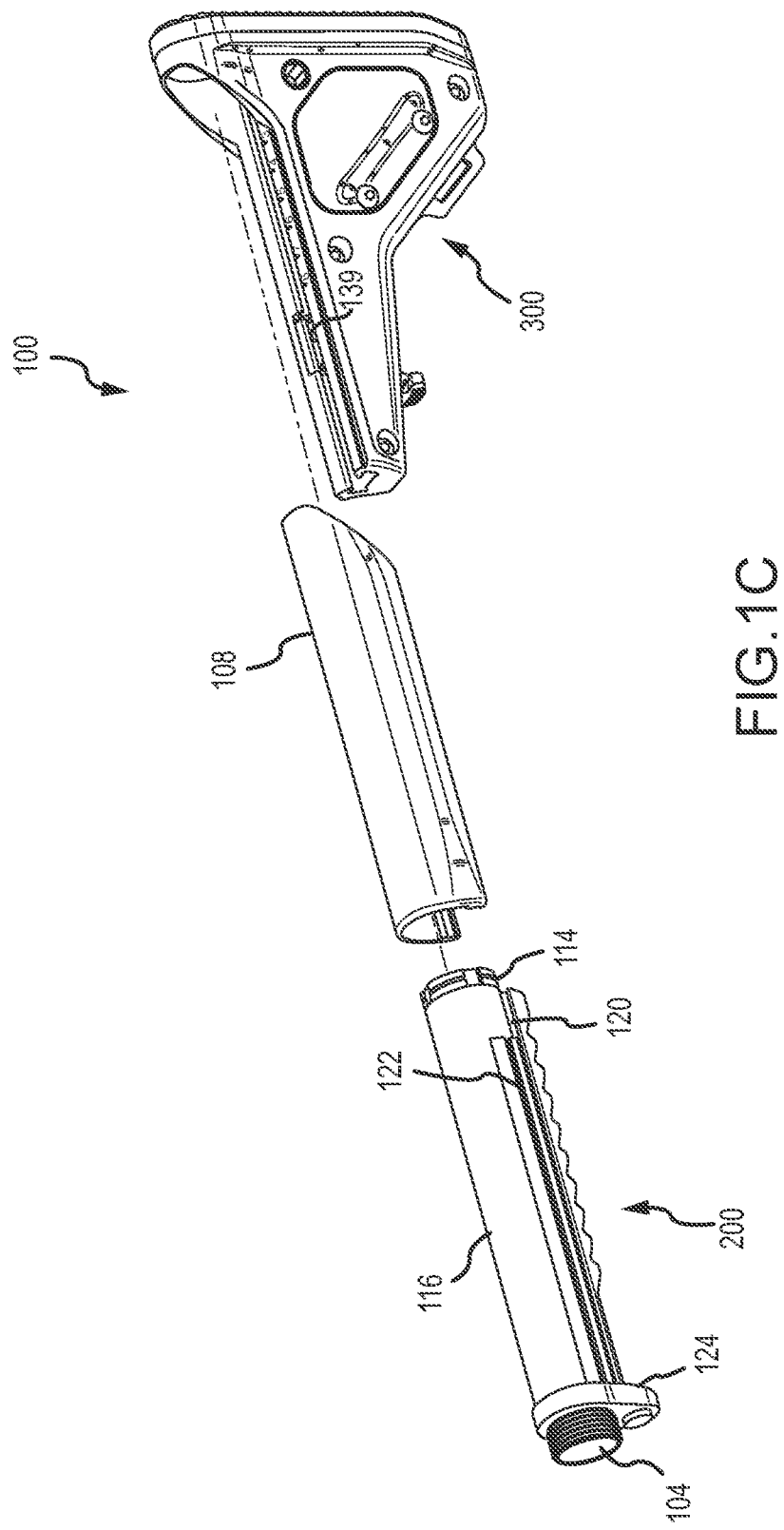
FIG. 1C is a perspective view of the stock assembly in FIG. 1, with a cheek piece and lower stock assembly disassembled.
Figure 1D:
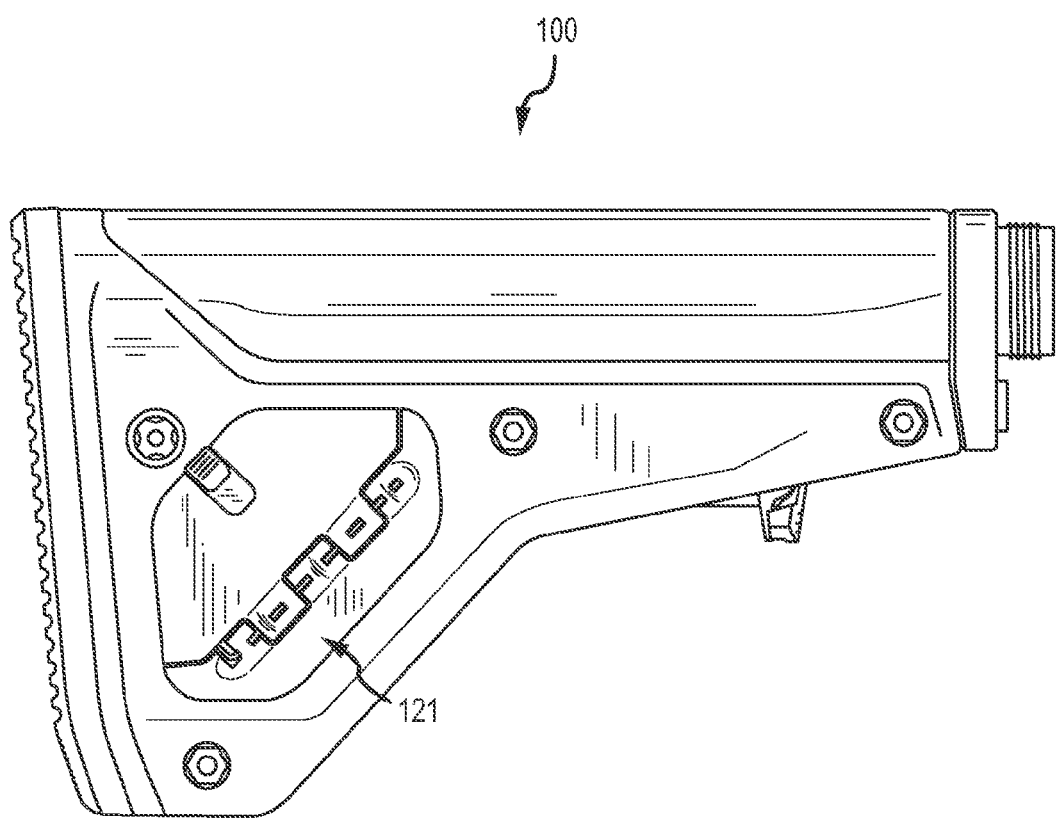
FIG. 1D is a side view of the stock assembly in FIG. 1, illustrating an opposing side.

As illustrated in FIGS. 1A-1C, the stock assembly 100 may be extendable, and the tube assembly 200 may be removably and slidingly attached to the lower stock assembly 300. That is, the stock assembly 100 may include a receiver extension assembly 200, or tube assembly 200 for short, a distal end of which may be affixed to a firearm, optionally with the cheek piece 108 attached, while the proximal end (e.g. butt pad 106) of the lower stock assembly 300 may be adjustable relative to the distal end of the stock assembly 100, such as relative to the distal end of the tube assembly 200, to adjust an overall length of the stock assembly 100. The lower stock assembly 300 may be removable from the tube assembly 200.

As illustrated in FIG. 1A, the optional cheek piece 108, when assembled, remains in a fixed position relative to the firearm and the tube assembly 200, while the lower stock assembly 300 is translated for adjusting the overall length of the stock assembly 100. A visual aid 102, as illustrated in FIG. 1B, may be provided to give the user an indication of the extended length of the stock assembly 100. In some embodiments, the stock assembly 100 may be extended up to about 4 (four) inches, possibly in one-half inch increments, or any suitable increment, from a fully collapsed configuration, although this specific example is not limiting, and greater or less than 4 inches of extension are envisioned.

As described above, the cheek piece 108 may remain attached to the tube assembly 200, and, in contrast to cheek pieces generally in the currently-available art as they relate to collapsible stocks, the cheek piece 108 does not move with the lower stock assembly 300 when the length is adjusted. In this manner, the tube assembly 200 remains mostly covered, regardless of the length of extension, ensuring that an insulating barrier is provided between the tube assembly 200 and the user. Although the particular cheek piece 108 does not move, it should be understood that a user could have multiple cheek pieces 108 available, to fit the preferences or needs of different users and/or weapon configurations.

As most clearly apparent in FIG. 1C, in some embodiments, the cheek piece 108 may be attached to the outer tube 116 by sliding the cheek piece 108 onto a proximal end of the outer tube 116 of the tube assembly 200 and into place. Thereafter, the lower stock assembly 300 may be attached to the tube assembly 200, generally stated, by sliding the lower stock assembly 300 onto the proximal end of the outer tube 116 and into place. Further details of assembly and/or disassembly procedures will be described in further sections below.

Figure 1E:
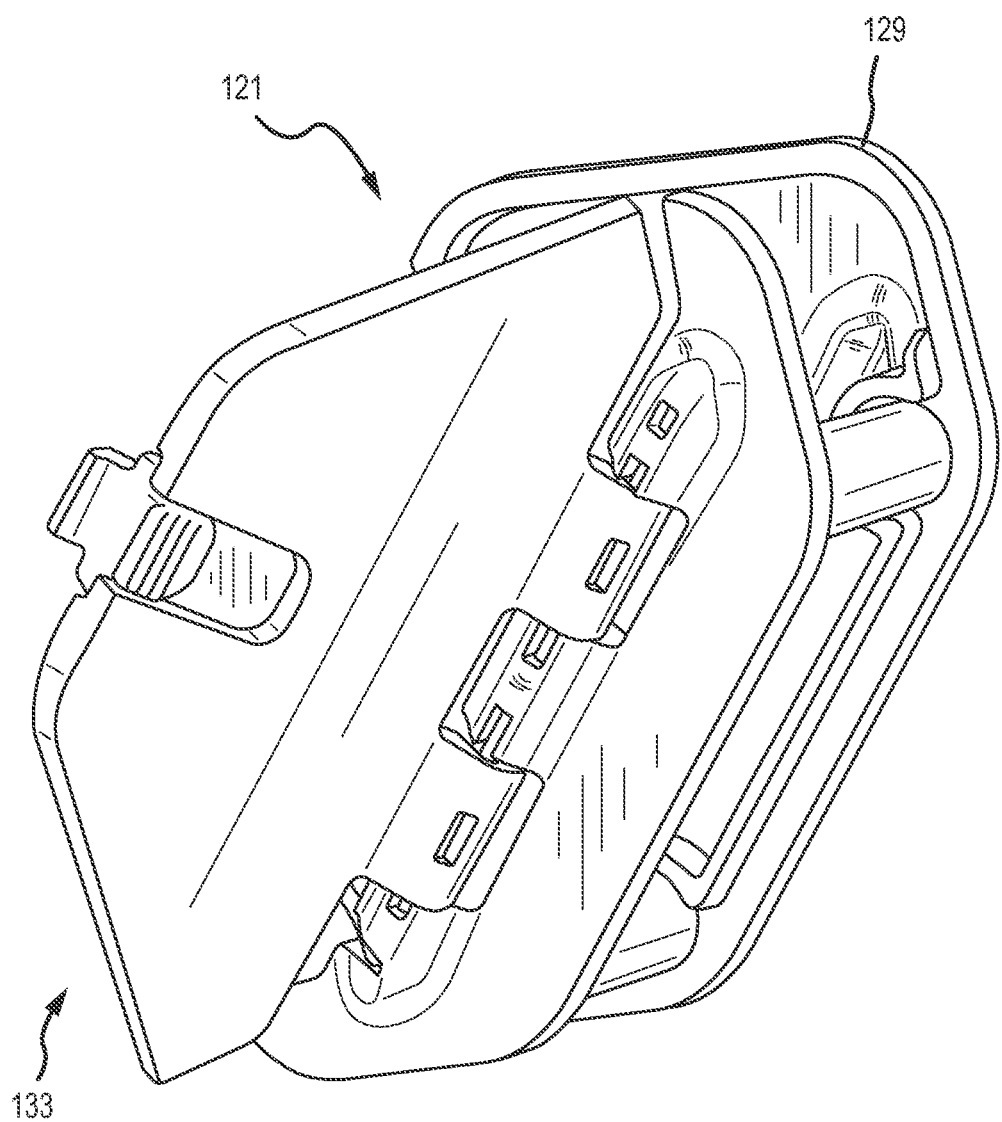
FIG. 1E is a perspective view of a panel and door assembly suitable for use with the stock assembly illustrated in FIG. 1A.
Figure 1F:
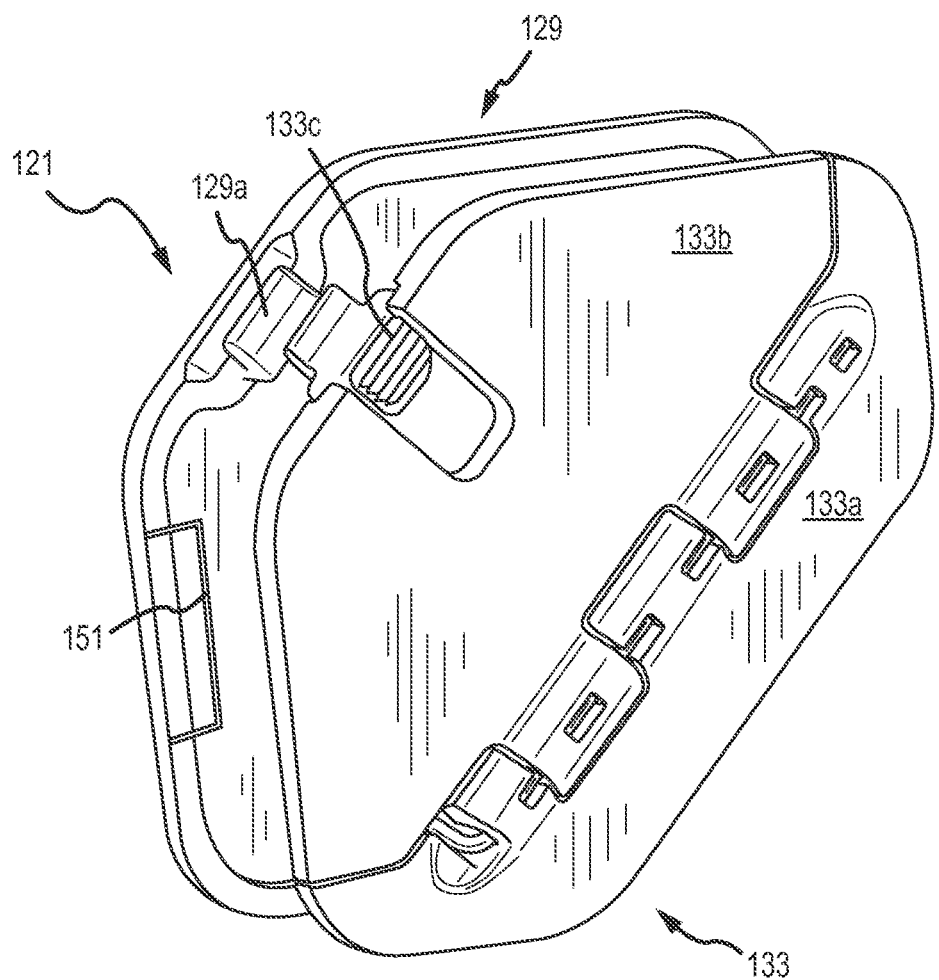
FIG. 1F is a rear perspective view of the panel and door assembly illustrated in FIG. 1E.
Figure 1G:
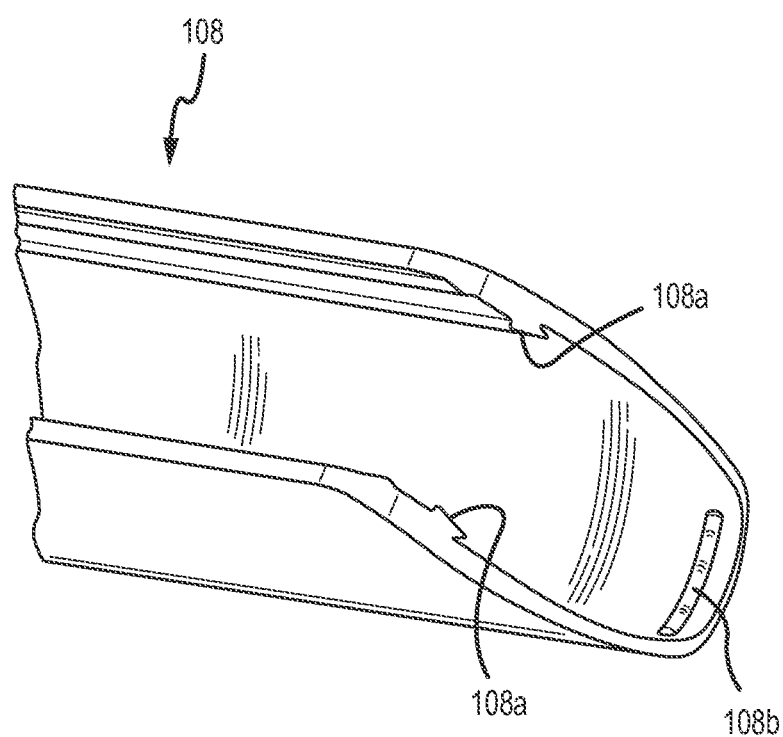
FIG. 1G is a detailed view of an exemplary cheek piece.
Figure 3:
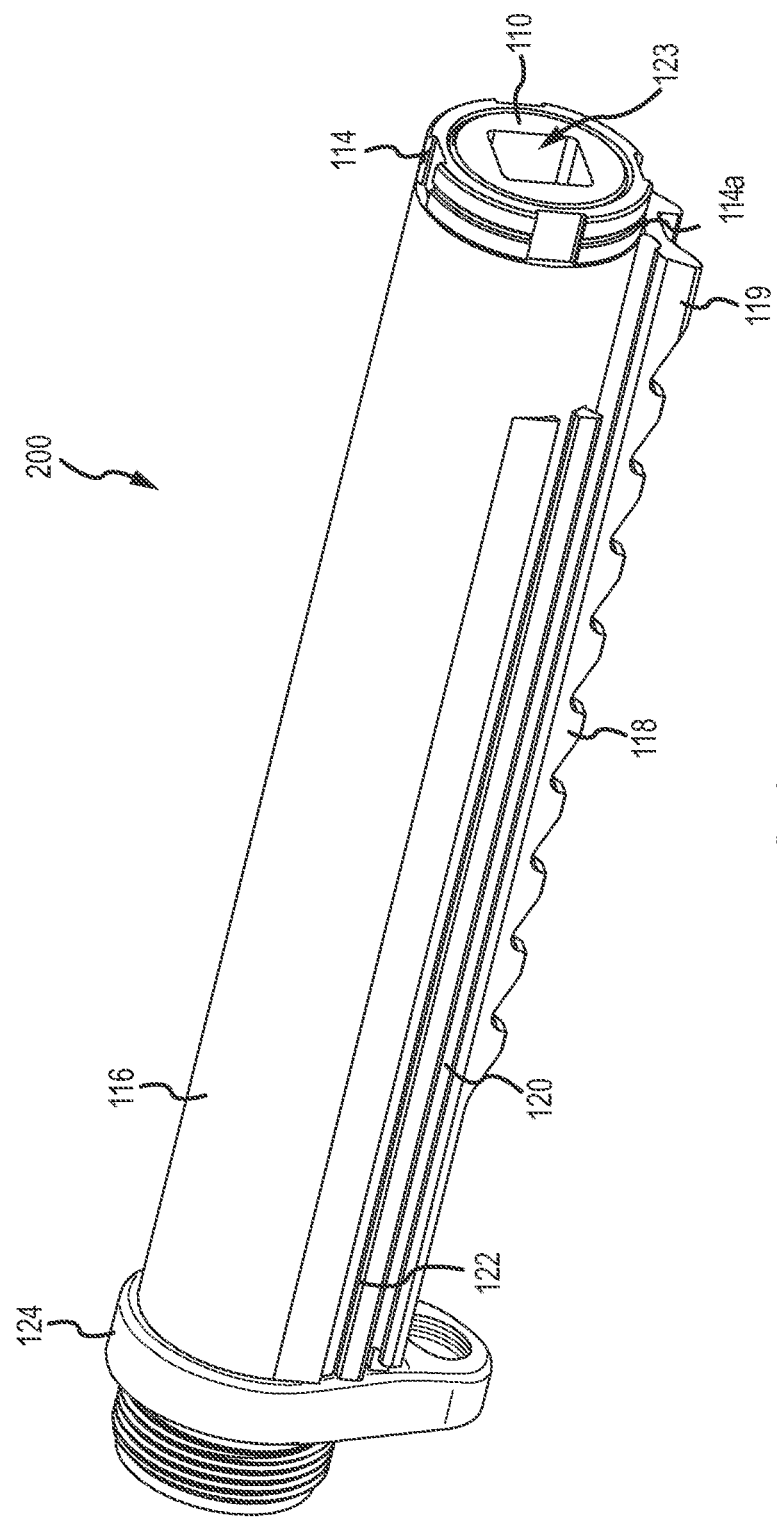
FIG. 3 is a rear perspective view of an exemplary receiver extension assembly.

With brief reference to FIG. 1G, the cheek piece may include one or more rails 108a for slidingly engaging one or more upper rails 122 in the outer tube 116 (shown in FIG. 1C), and a detent 108b on an interior surface of the cheek piece at one or more of the proximal region and the distal region of the cheek piece 108 for maintaining the cheek piece 108 in place when attached to the outer tube 116 (shown in FIG. 1C). As illustrated in FIG. 1G, the cheek piece 108 includes a detent 108b at a proximal region of the cheek piece 108, and, as illustrated in FIG. 3, a recess 114a in the nut 114 may accept the detent 108b.

Continuing with FIG. 1, the outer stock body 154 may include a sling interface 193 and/or a storage compartment 121. The storage compartment 121 may be comprised of a first side 129 and a second side 133 assembled to the outer stock body 154. The first and second sides 129, 133 are most clearly illustrated in FIG. 1E, and may be shaped to be coupled to each other via one or more fasteners 137 (shown in FIG. 1B). The first and second sides 129, 133 may be coupled to the outer stock body 154, for example, by tightening the fastener(s) 137 and causing the first side 129 and the second side 133 to firmly abut opposing recessed walls 145 in the outer stock body 154 to form the storage compartment 121. The storage compartment 121 or first and second sides 129, 133 may be reversible to more comfortably accommodate a right- or left-hand user.

In some embodiments, the first side 129 and the second side 133 may each include score lines 151. The score lines 151 may be provided to allow a user who desires to have a simple sling mounted higher on the stock 100 than the sling loop 193 would allow, for additional stability and prevention of weapon roll in certain carry methods, to remove a small section of material from the first side 129 and the second side 133. Removal of this material would allow a user the flexibility of threading a sling or other carrying device through the newly-created slot to allow the user to carry the weapon in a more vertical position without removing the storage compartment 121 completely. The user would still have the flexibility to remove the storage compartment 121 completely and carry the firearm in the same manner.

In some embodiments, the first side 129 and the second side 133 may each have a recess (not shown) for allowing a sling or other attachment feature to pass through, either placed by a manufacturer or after removal of material at the score lines 151 by the user.

Continuing with FIGS. 1E and 1F, the second side 133 may include a first portion 133a that provides both a stationary surface and a surface to which the first side 129 may be attached, and a second portion 133b, shaped to pivot relative to the first portion 133a. The second portion 133b may include a tab 133c biased, such as by a spring, towards engagement with the outer stock body 154 to cause the second side 133 to engage multiple surfaces in the outer stock body 154.

The first side 129 may similarly include a fixed flange portion 129a to allow the user to assemble the first and second sides 129, 133 to the outer stock body 154 (shown in FIG. 1) to form the storage compartment 121.

To form the storage compartment 121 as shown in FIG. 1, the user may insert the first side 129 into the through passage of the outer stock body 154 at an angle and then pivot the first side 129 to cause both sides of the fixed flange 129a to interface with multiple surfaces in the outer stock body 154. The user may similarly retract the tab 133c to attach the second side 133 to the outer stock body 154, and thereafter may cause the fastener(s) 137 to couple the first side 129 and the second side 133 together such that the first side 129 and the second side 133 are coupled to the outer stock body 154.

Figure 3A:
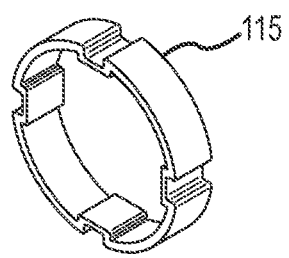
FIG. 3A is a perspective view of an exemplary adapter tool that may be used to interface with the nut illustrated in FIG. 3.

Turning now to FIGS. 2, 3, and 3A, a receiver extension 110 (shown in FIGS. 2 and 3) may be provided, in which the distal end or distal region of the receiver extension 110 may comprise a threaded receiver interface 104 and a flange or shoulder 105 between the threaded receiver interface 104 and the proximal end 112, while the proximal end 112 of the receiver extension 110 may comprise a threaded nut interface, for receiving a threaded nut 114.

The receiver extension 110 may be assembled into a receiver extension assembly 200 by assembling the receiver extension 110, the end plate 124, an outer tube 116, and the threaded nut 114, as illustrated in FIG. 3. The remaining components of the stock assembly 100 may be attached after attaching the tube assembly 200 to the firearm, as will be described in further detail later portions of this document, in a manner that reduces the potential for damage to the receiver extension 110 and/or an error in attachment as compared to other currently-available designs.

A nut adapter tool 115, illustrated in FIG. 3A, may be provided to allow a user to interface with the nut 114 using standard tooling.

Figure 4:
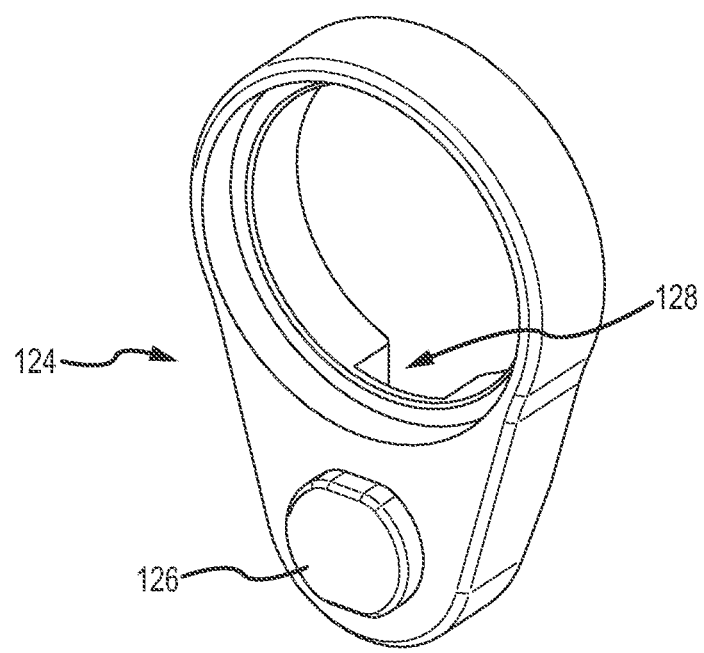
FIG. 4 is a perspective view of an exemplary receiver end plate.
Figure 4A:
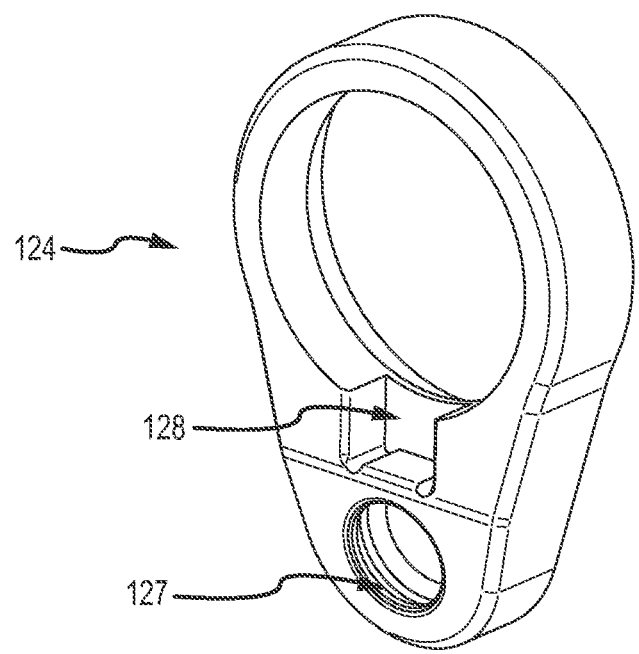
FIG. 4A is a rear perspective view of the end plate in FIG. 4.

As illustrated in FIGS. 4 and 4A, the end plate 124 may include a receiver alignment mechanism 126, a QD socket 127, and an outer tube alignment mechanism 128. That is, the end plate 124 is shaped to align the outer tube 116 to the receiver of a firearm, and may provide a QD interface, suitable for use when the lower stock assembly 300 is not in full abutment with the end plate 124, such as when the lower stock assembly 300 is in any extended position, such as when extended as illustrated in FIG. 1A.

Returning to FIGS. 4 and 4A, to assemble the tube assembly 200 (shown in FIG. 3) as a stand-alone assembly, the end plate 124 may be slid over the receiver extension 110, then the outer tube 116 may be slid over the receiver extension 110, at which point the end plate 124 is rotated to mate the outer tube alignment mechanism 128 with a corresponding key alignment mechanism 125 (see FIG. 5A) in the outer tube 116 (shown in FIG. 3), such as a tab that extends from a distal end of the outer tube 116. The threaded nut 114 is then screwed on to the proximal end of the receiver extension 110.

The tube assembly 200 eliminates the need to attach a proximal end to the assembly, which is required in some currently-available embodiments, thereby providing a lighter weight design and improved firing accuracy while avoiding significant assembly, welding, and/or machining procedures.

Moreover, the construction of the tube assembly 200 using the threaded nut 114 as illustrated allows the receiver extension 110 to serve as the back end of the core weapon mechanism in a manner similar to a carbine type receiver extension while simultaneously retaining the strength of a rifle type receiver extension. Another advantage of constructing the tube assembly 200 in this manner is that it allows the outer tube 116 to be extruded without further assembling an end cap thereon.

To assemble the tube assembly 200 and/or stock assembly 100 to a firearm, the receiver extension 110 may be attached to a weapon receiver, such as by threading onto a weapon receiver. The end plate 124 may be placed on the receiver extension 110 and seated against the receiver, and the outer tube 116 may be placed on the receiver extension 110 and keyed into the end plate 124. The threaded nut 114 may then be attached and tightened to lock the tube assembly 200 on the receiver. A cheek piece 108 may be slid over the outer tube 116 and locked into place prior to attaching a lower stock assembly 300.

Providing a tube assembly in this manner improves the ease of aligning the tube assembly 200 to the firearm, and also reduces undesirable torsional stresses between the tube assembly 200 and the firearm.

Returning to FIG. 3 and FIG. 1C, the outer tube 116 may have a lower rail 120 or a pair of lower rails 120 for mounting a lock assembly (see e.g. lock assembly 500 in FIG. 5A), and/or an upper rail 122 or a pair of upper rails 122 for mounting a cheek piece 108 (see e.g. FIG. 1). That is, the tube assembly 200 may be configured such that a lock assembly, such as lock assembly 500, may slide onto a first rail, such as lower rail(s) 120. Similarly, the tube assembly 200 may be configured to interface with a rail (see e.g. rail 108a in FIG. 1G) in a cheek piece and to removably retain the cheek piece 108, by allowing the cheek piece 108 to slide onto the tube assembly 200 using another rail or rails, such as the upper rail(s) 122. It should be understood that the cheek piece 108, while optional, should be assembled to the tube assembly 200 prior to attaching the lower stock assembly 300, and/or that the lower stock assembly 200 should be removed prior to removal of the cheek piece 108.

Continuing with FIG. 3, the outer tube 116 may include a plurality of teeth 118, 119 that provide a number of recesses or catches for adjusting the length of the stock assembly 100. The plurality of teeth 118, 119 may include at least one positioning tooth 118 which may be selectively engaged for selecting and/or adjusting an overall length of the stock assembly 110. At least one safe tooth 119 of the plurality of teeth 118, 119 may have a profile that is larger than the profile of the other teeth, that is, the positioning teeth 118, so as to provide an end stop feature. More specifically, a safe tooth 119 may extend further from a main body of the outer tube 116 than does a positioning tooth 118, to prevent a user from unintentionally removing the lower stock assembly 300 from the tube assembly 200. To remove the lower stock assembly 300 from the tube assembly 200, an override mechanism should be engaged, as will be described in subsequent portions of this document.

With reference to FIGS. 2 and 3, the proximal end 112 of the receiver extension 110 may include a drive 123. The drive 123 may provide the user with the ability to attach the receiver extension 110 to the firearm, and tighten the receiver extension 110 to a desired torque specification. In some embodiments, the drive 123 may be shaped for engagement by a user without using specialized assembly tools and without compromising a maximized torque application. In some embodiments, the drive 123 may be a square socket drive, as illustrated, although it should be understood that any suitably-shaped drive is contemplated, including but not limited to, external knurling, ribbing, or polygonal drives such as square, hex, or pentagonal drives, or internal drives such as slotted, Phillips, Torx, spanner, piloted, square, hex, pentagonal, or security drives, or any combinations thereof.

Figure 5:
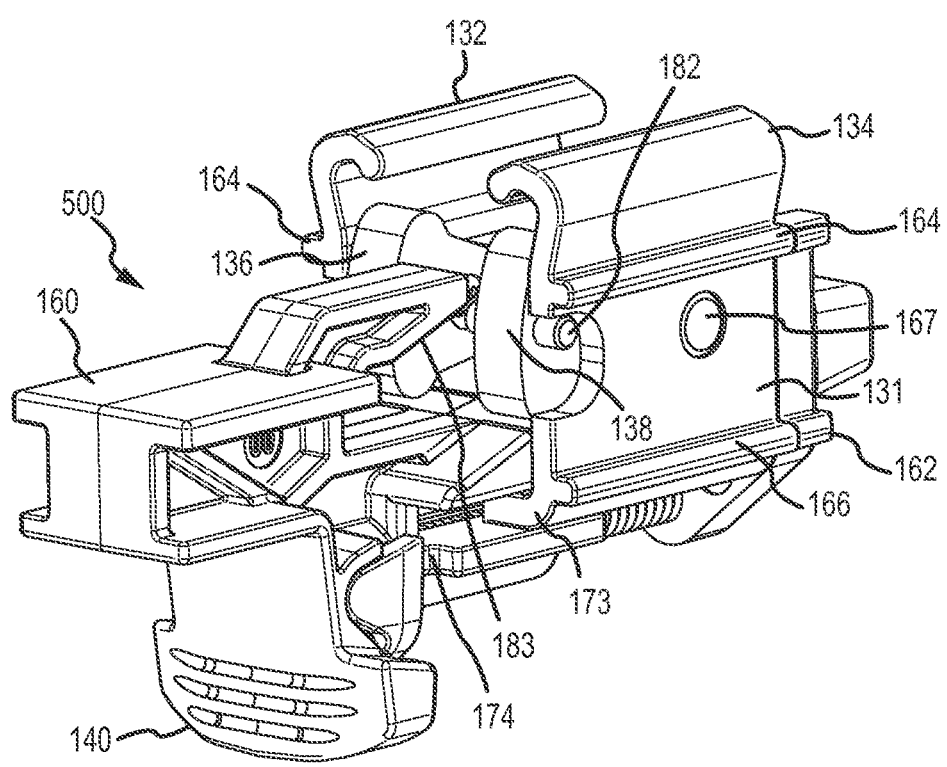
FIG. 5 is a perspective view of an exemplary lock assembly.
Figure 5C:
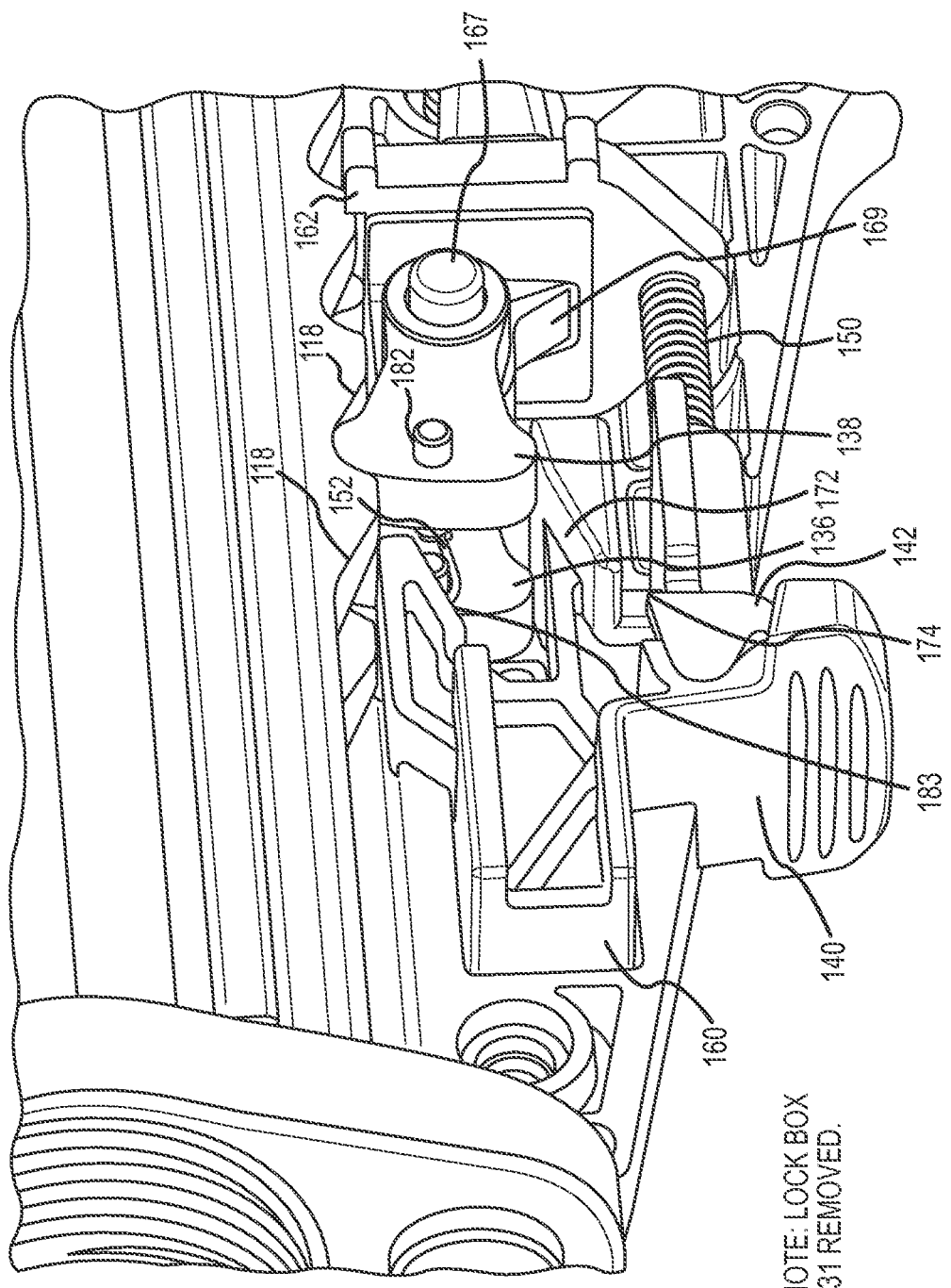
FIG. 5C is a detailed perspective view illustrating the lock assembly in FIG. 5 interfacing with other components of the stock assembly.
Figure 5D:
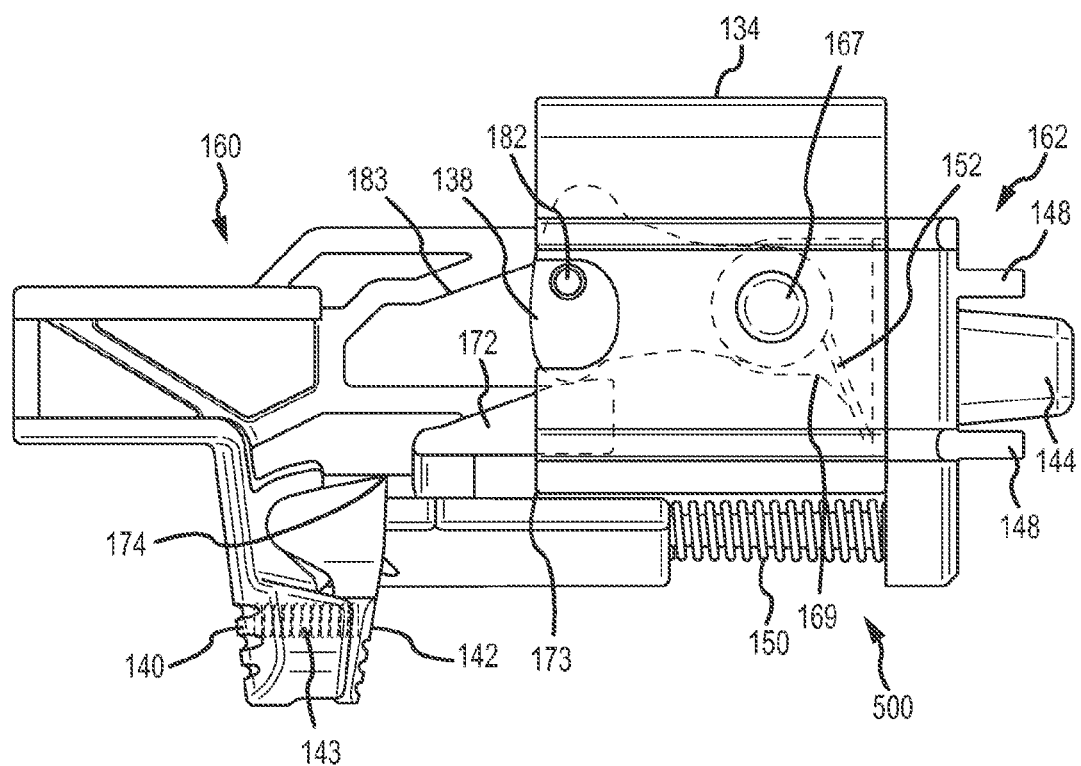
FIG. 5D is a side view of the lock assembly in FIG. 5 with some features transparent.
Figure 5E:
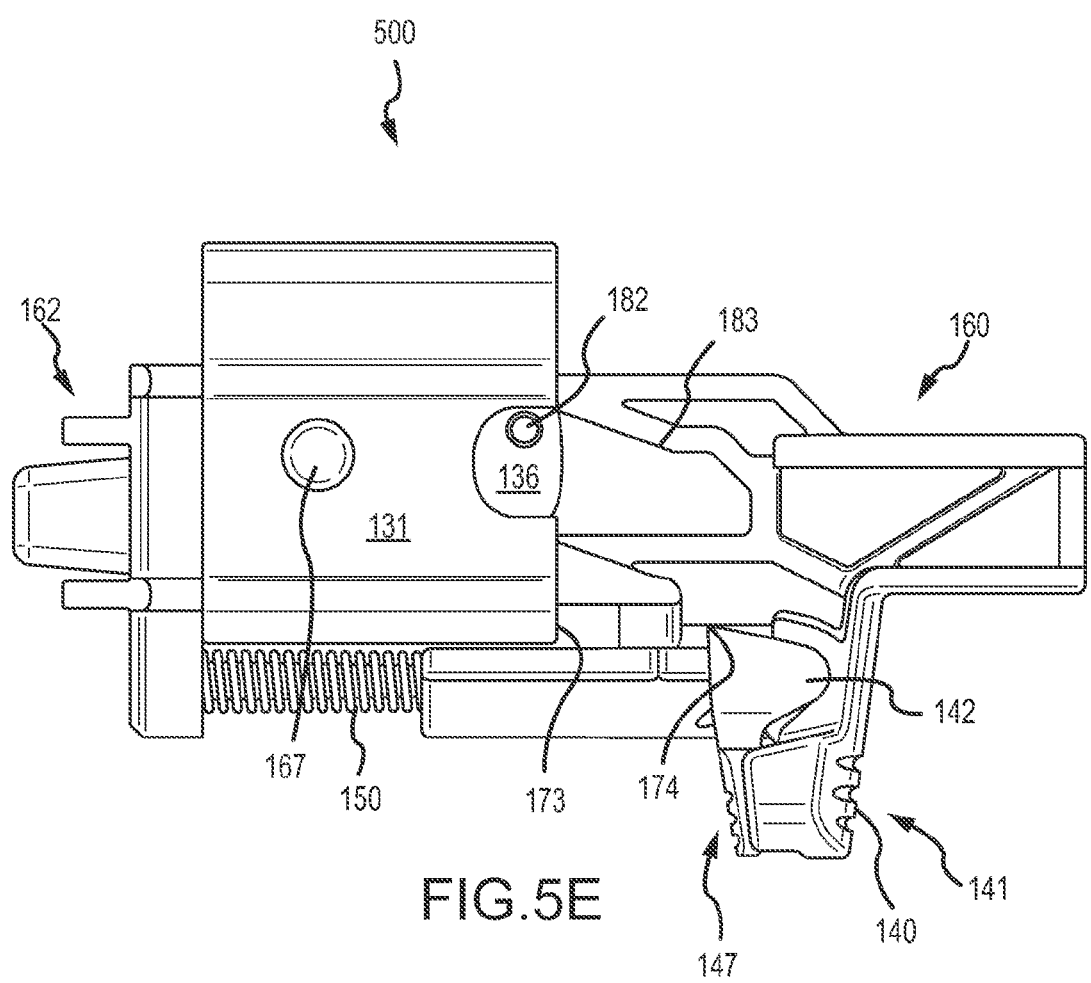
FIG. 5E is a side view illustrating another side of the lock assembly illustrated in FIG. 5.
Figure 5F:
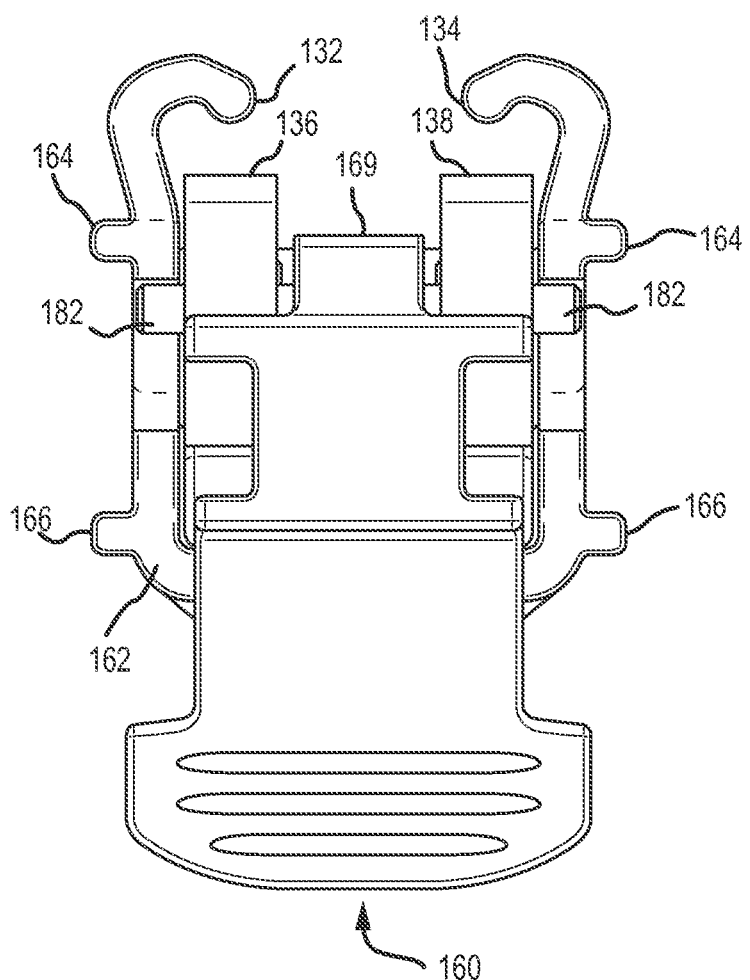
FIG. 5F is a front view of the lock assembly illustrated in FIG. 5.
Figure 5G:
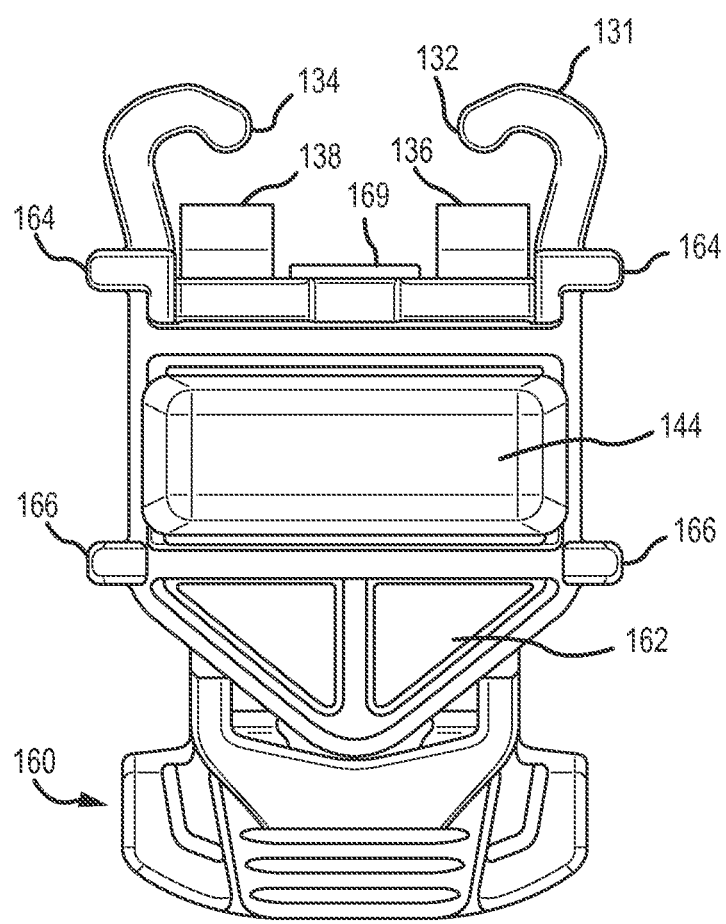
FIG. 5G is a rear view of the lock assembly illustrated in FIG. 5.
Figure 5H:
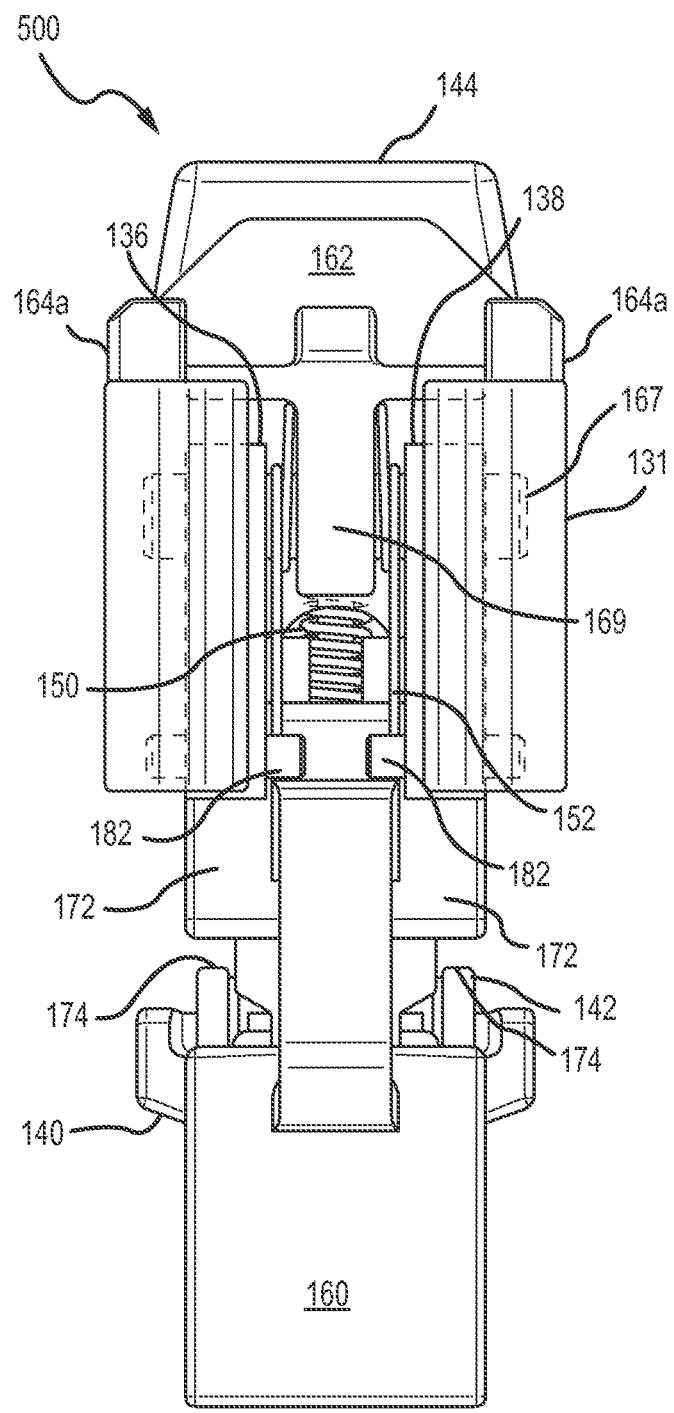
FIG. 5H is a top view of the lock assembly illustrated in FIG. 5, with some features transparent.
Figure 5J:
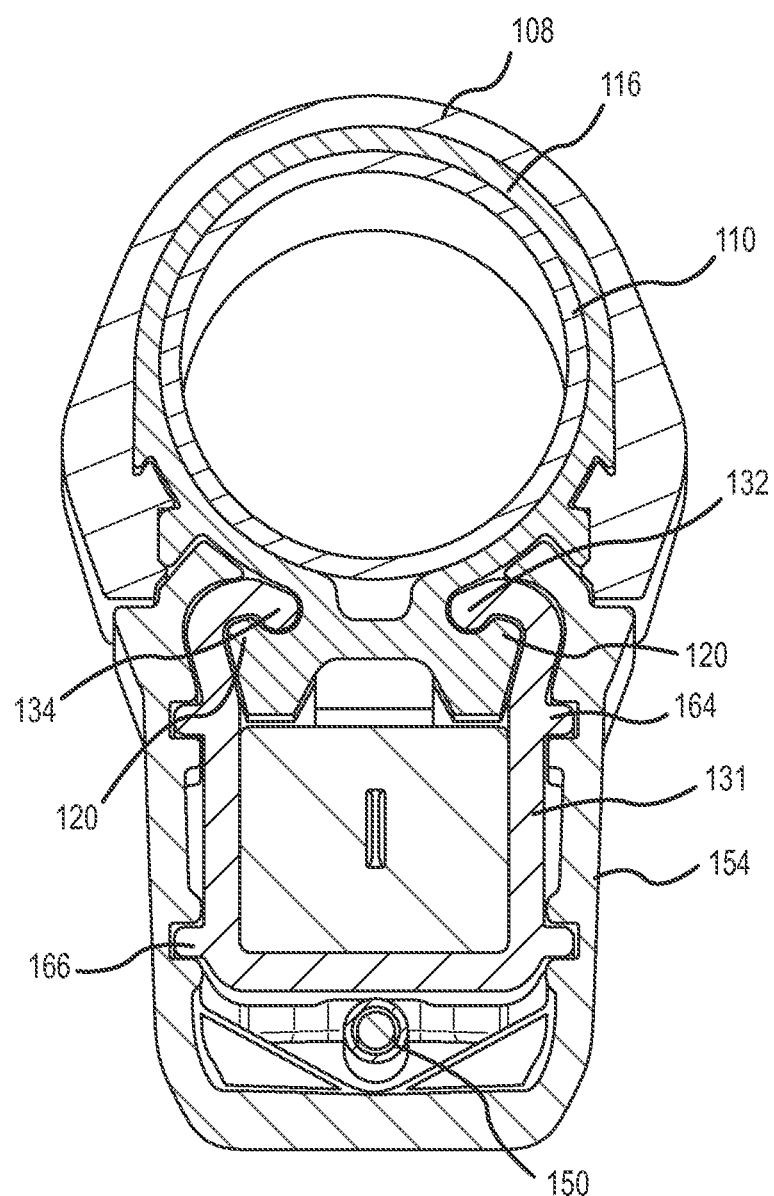
FIG. 5J is a rear section view illustrating the lock assembly in FIG. 5 interfacing with a body of a stock and an outer tube of a tube assembly.

Turning now to FIGS. 5-5J, the stock assembly 100 may include a lock assembly 500. The lock assembly 500, generally speaking, is what provides the user with the ability to adjust the overall length of the stock assembly 100. The lock assembly 500 may include a lock box 131 that has a first rail 132 and a second rail 134 for slidingly engaging the tube assembly 200, such as at the lower rail(s) 120 (see FIG. 3). To maintain the lock assembly 500 (and hence the lower stock assembly 300 and butt pad 106) in a fixed position relative to the tube assembly 200, the lock assembly 500 may be configured to engage teeth 118, 119 using one or more pawls 136, 138. In some embodiments, the lock box 131 may have a first pawl 136 and a second pawl 138 movably or pivotally attached thereto, for engaging one of a plurality of teeth 118, 119 in the tube assembly 200.

The outer body 154 may be manufactured of a material having a first hardness, and in some embodiments, the outer body 154 is made substantially of a polymeric material. The outer tube 116 may be manufactured of a metallic material, which may be an aluminum alloy or a steel, such as a carbon steel or a steel alloy. The lock box 131 may be manufactured of a material having a second hardness, and in some embodiments, the lock box 131 is made of a metallic material, which may be an aluminum or a steel, such as a carbon steel or steel alloy. The pawl(s) 136, 138 may be manufactured of a material having a third hardness, and in some embodiments, the pawl(s) 136, 138 are made of a metallic material, which may be a steel, such as a carbon steel or steel alloy. That is, in some embodiments, the lock box 131 and/or the outer tube 116 is made of a material that has a hardness greater than that of the outer body 154, and the pawl(s) 136, 138 are made of a material that has a hardness greater than that of the lock box 131. Selecting the materials as described above results in a stock assembly 100 that is lighter in weight as compared to currently-available designs, yet provides an improved firing accuracy.

The lock assembly 500, as illustrated in FIG. 5A, may be attached to the outer tube 116 by way of the rails 132, 134. That is, the rails 132, 134 may slide over the lower rail(s) 120 in the outer tube 116 as the stock assembly 100 is being assembled or disassembled. It should be understood that the lower stock assembly 300 comprising the lock assembly 500 is a stand-alone assembly, and may be assembled to the tube assembly 200 before or after the tube assembly 200 is attached to a firearm.

FIG. 5A illustrates in a side view details of the lock assembly 500 attached to the tube assembly 200 (with the end plate 124 removed). As previously mentioned, the lock assembly 500 has a fore body 160 and an aft body 162. An elastic element such as a spring 150 between the fore and aft bodies 160, 162 is provided to keep the fore and aft bodies 160, 162 biased towards the surface 156 and the opposing surface 158 in the outer stock body 154, as illustrated in FIG. 5B. However, the fore and aft bodies 160, 162 may be compressed towards one another to allow the pawl(s) 136, 138 to disengage from the teeth 118, 119, such as when the lower stock assembly 300 is pulled or pushed along the tube assembly 200.

As illustrated in FIGS. 5B-5C, an elastic element, such as a spring 152, which may be a torsional spring, may be provided to bias the one or more pawls 136, 138 towards engagement with the teeth 118, 119, while another elastic element such as a spring 150, which may be a compression spring, may be provided to bias the fore body 160 and the aft body 162 in an expanded configuration. It should be understood that a variety of elastic elements may be used to achieve the biasing effect. When a user pulls on the grip 140 hard enough to overcome the spring bias of the spring 150, the fore body 160 is pulled towards the aft body 162, into a first compressed figuration. This first compressed configuration allows the user to push or pull the lower stock assembly 300 along the lower rail(s) 120 to achieve a desired overall length of the stock assembly 100.

To enable this functionality, the pawl(s) 136, 138 may include pawl pin(s) 182 shaped to engage a surface(s) 183 in the fore body 160 as the lock assembly 500 is compressed and forcibly cause the pawl(s) 136, 138 to rotate out of engagement with the one or more positioning teeth 118. More specifically, and as is most clearly seen in FIGS. 5B and 5C, as the user causes the fore body 160 to move towards the aft body 162 (by pulling on the grip 140, for example), the surface(s) 183 will abut the pawl pin(s) 182, and force the pawl(s) 136, 138 to pivot out of engagement with the positioning teeth 118. As the pawl(s) 136, 138 pivot out of engagement, they may abut and ride down a ramped surface(s) 172.

A surface(s) 174 in the grip 140 may be shaped to abut a stop surface(s) 173 when the lock assembly 500 reaches the first compressed configuration, and to prevent the lock assembly 500 from compressing more than the first compressed configuration. In some embodiments, the stop surface(s) 173 may be one or more shoulders in the lock box 131, as illustrated in FIGS. 5D and 5E. Those of skill in the art will understand that the stop surface(s) 173 could be placed in other components of the stock assembly 110, such as the outer stock body 154, the pawl(s) 136, 138, the aft body 162, or any other feature that is or may be modified to be suitable for providing a stop surface.

To disengage the lower stock assembly 300 from the tube assembly 200 completely, the user may pivot, translate, or compress a release member 142 relative to the grip 140 or fore body 160, to cause the surface(s) 174 to move relative to the stop surface 173 and/or disengage from the stop surface 173. After ensuring the release member 142 or surface 174 is disengaged from the stop surface 173, the user may further compress the fore body 160 relative to the aft body 162 and forcibly cause the pawl(s) 136, 138 to pivot further away from the engaged configuration to ensure the pawl(s) 136, 138 disengage from the safe tooth 119 and/or do not engage the safe tooth 119 as the lower stock assembly 300 is translated relative to the tube assembly 200, thus allowing the user to remove the lower stock assembly 300 from the tube assembly 200. Specifically, as illustrated in FIG. 5D, the release member 142 may be biased away from the grip 140 by way of spring 143.

As illustrated in FIG. 5E, in some embodiments, a first release mechanism 141 includes the grip 140, the spring 150, a pawl pin(s) 182, and the surface(s) 183, shaped and positioned to cause the lock assembly 500 to move into a first compressed configuration. Similarly, a second release mechanism 147 may include the release member 142, the spring 143, the surface(s) 174, and the stop surface(s) 173, shaped and positioned to bias the lock assembly 500 towards the first compressed configuration, and allow a user to override the bias and cause the lock assembly 500 to move into a second compressed configuration. The release member 142 may remain in a first position relative to the fore body 160 during actuation of the first release mechanism, and the release member 142 may translate, pivot, or otherwise move to a second position relative to the fore body 160 during actuation of the second release mechanism 147.

With simultaneous reference to FIGS. 5B and 5F, the aft body 162 may include a pin retaining feature 169. The pin retaining feature 169 may be a passage for mounting a pin(s) 167 to retain the pawl(s) 136, 138 pivotally coupled to the aft body 162. Similarly, and with reference to FIG. 6, the lock box 131 may also include a passage(s) or pin retaining feature(s) 176 to retain the pawl(s) 136, 138 pivotally coupled to the lock box 131, such that the pawl(s) 136, 138 may pivot relative to the aft body 162 and the lock box 131 to disengage from the teeth 118 or the safe tooth 119.

Although the figures and the description above refer to a compressed configuration as being suitable for disengagement from the tube assembly 200, those of skill in the art will understand that the lock assembly may be arranged to require a first extended configuration to allow the user to adjust the length of the stock, and a second extended configuration to allow the user to remove the lower stock assembly from the tube assembly 200. That is, the lock assembly may include an elastic element, in some embodiments a tension spring that biases the lock assembly towards an engaged configuration. The engaged configuration may be a configuration in which a fore body is compressed, instead of extended, relative to an aft body, and one or more pawls 136, 138 in the lock assembly are biased towards engagement with one or more teeth in a tube assembly 200, to lock the lower stock assembly to the tube assembly 200. A grip may be coupled to the fore body or the aft body, to allow the user to override the elastic element to cause one of the fore body and the aft body of the lock assembly to translate relative to the other one of the fore body and the aft body. The grip may allow the user to pull the aft body towards the user while maintaining the fore body in a fixed position, thus causing the lock assembly to move into an extended configuration or a first disengaged configuration. As the lock box is moved into the first disengaged configuration, one or both of the fore body and aft body may override the bias of one or more pawls to forcibly cause the one or more pawls to pivot into a first disengaged configuration in which the one or more pawls are disengaged from one or more teeth in the tube assembly 200. The first disengaged configuration may allow the user to translate a lower stock assembly relative to a receiver extension assembly or tube assembly 200 to adjust an overall length of a stock assembly.

An elastic element may allow a user to override a safety stop to remove the lower stock assembly from the tube assembly 200. In some embodiments, the elastic element providing an override mechanism may be a third elastic element such as spring 143, as illustrated in FIG. 5D. For example, the elastic element may bias a release member towards engagement with a stop surface when the lock assembly is in the first disengaged configuration. The user may override the bias of the elastic element and move the release member relative to the stop surface, thereby causing the release member to disengage from the stop surface. In some embodiments, spring 150 may be a first elastic element, nub 144 may be a second elastic element, spring 143 may be a third elastic element, and spring 152 may be a fourth elastic element, although it should be understood that four elastic elements are not required in all embodiments. With the release member disengaged from the stop surface, the user may cause the fore body or aft body to further translate relative to the other of the fore body and aft body, and forcibly disengage the one or more pawls from a safe tooth in the tube assembly 200.

Figure 6:
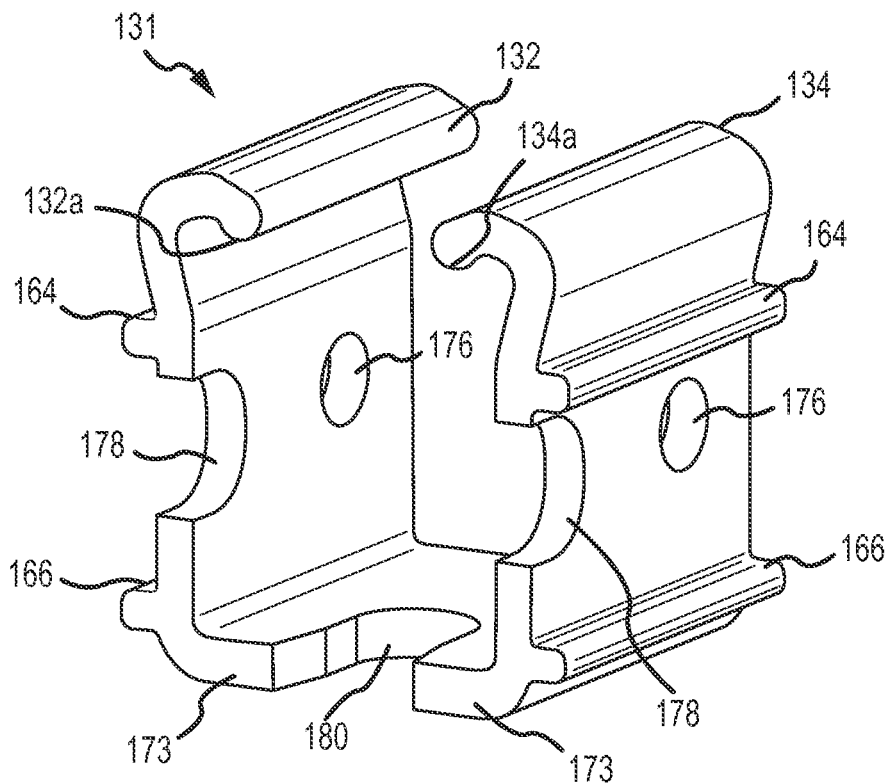
FIG. 6 is a perspective view of an exemplary lock box.

With reference to FIG. 6, the lock box 131 may include a first rail 132 and a second rail 134 having a first profile 132*a* and a second profile 134*a*, wherein the first and second profiles 132*a*, 134*a* are shaped to limit the lock box 131 to linear movement along the outer tube 116. The lower rail(s) 120 in the outer tube 116 may include a corresponding profile that limits the distance from center that the rail(s) 132, 134 can deflect.

In some embodiments, and with reference to FIGS. 5-5I, a motion limiter between an outer stock body 154 and a lock box 131 and/or tube assembly 200 may be provided. In some embodiments, an elastic element or compression mechanism, such as a deformable nub 144, and one or more protrusions 148 may be affixed to or part of the aft body 162 such that, when the assembled stock assembly 100 is slammed to the ground, such as by a user attempting to clear a portion of the firearm or dropping the firearm, a limiter in the outer stock body 154, such as a surface 156 compresses the nub 144, and may travel (relative to the lock box 131 and tube assembly 200) until the outer stock body 154 abuts the protrusion(s) 148. That is, the lock assembly 500 and tube assembly 200 do not move relative to each other, but the other portions of the lower stock assembly 300 may move or "give" relative to the lock assembly 500 and tube assembly 200. The motion limiter may be comprised of the deformable nub 144 and protrusion(s) 148 in the lock box assembly 500 and the surface 156 in the outer body 154. The motion limiter may also provide some additional shock absorption when the firearm is fired. It should also be understood that an opposing surface 158 in the outer stock body 154 may provide a wall against which the fore body 160 may be compressed when the lock assembly 500 is biased towards an extended configuration.

As seen most clearly in FIG. 5A, the lock assembly 500 may be compressible. The lock assembly 500 may have a first compression mechanism that allows for an overall change in length of the lock assembly, and specifically a reduction in distance between the fore body 160 and the aft body 162. In some embodiments, a first elastic element or a spring 150 between the fore body 160 and the aft body 162 of the lock assembly 500 may bias the fore body 160 and the aft body 162 away from each other. A user may compress the fore body 160 towards the aft body 162 to overcome the biasing effects of the first elastic element or spring 150, thereby decreasing the overall length of the lock assembly 500 and allowing the pawl(s) 136, 138 to pivot relative to the aft body 162. To maintain the lock assembly 500 in alignment with the outer stock body 154 of the stock assembly 100, the aft body 162 may include rails 164a, 166a, seen most clearly in FIGS. 5 and 5H, that align with rails 164, 166 of the lock box 131 and engage the outer stock body 154.

Referencing now FIGS. 5, 5B, and 5D, FIG. 5D illustrates another side view of the lock assembly 500 with the lock box 131 drawn transparently, to illustrate how the pawl(s) 136, 138 interface with the fore body 160, and specifically the ramped surface(s) 172. As can be seen in FIG. 5D, when the fore body 160 and the aft body 162 are in the extended configuration, the pawl(s) 136, 138 are biased by spring 152 towards engagement with the teeth 118, 119. The lock assembly 500 would therefore remain fixed relative to the tube assembly 200 when in the extended configuration (see e.g. FIG. 5A).

However, when the user compresses the fore body 160 towards the aft body 162 (by pulling on the grip 140, for example), the pawl(s) 136, 138 are forcibly rotated a first distance away from engagement with the positioning teeth 118. This may be achieved by causing a surface(s) 183 to abut the pawl pin(s) 182 or other portions of the pawl(s) 136, 138 and force the pawl(s) 136, 138 to move away from engagement with the positioning teeth 118 as the assembly is compressed. Simultaneously, the pawl(s) 136, 138, may slide down the ramped surface(s) 172 as the ramped surface(s) 172 is moved proximally with the fore body 160. When the fore body 160 is moved towards the aft body 162 into a first compressed configuration, the surface 174 may abut a stop surface 173, thus preventing the user from compressing the lock assembly 500 beyond the first compressed configuration, unless and until an override mechanism is engaged. While holding the lock assembly 500 in the compressed configuration, the user may adjust the length of the stock assembly 100 by translating the lower stock assembly 300 relative to the tube assembly 200. During this adjustment, the pawl(s) 136, 138 pass over the positioning teeth 118.

When the lower stock assembly 300 (illustrated in FIG. 1A) is pulled out enough such that the pawl(s) 136, 138 engage the safe tooth 119, the user may then engage an override mechanism to allow the lower stock assembly 300 to be removed from the tube assembly 200. Here, the user may additionally depress the release member 142, causing the surface(s) 174 to rotate down or otherwise disengage from the surface(s) 173, thereby allowing the user to compress the lock assembly 500 even further and forcibly causing the pawl(s) 136, 138 to rotate further away from the engaged configuration and disengage from the safe tooth. The lower stock assembly 300 may be removed at this point.

In some cases, the user may compress the release member 142 before or at any time during compressing the lock assembly 500, so that the user may remove the lower stock assembly 300 in a single motion.

FIG. 5E illustrates an opposing side view of the lock assembly 500, demonstrating that many components, such as the pawl(s) 136, 138 and other portions of the lock assembly 500 may be mirrored on either side of a center of the lock assembly 500. Similarly, FIGS. 5F-5H illustrate, respectively, front, rear and top views of the lock assembly 500, with the lock box 131 transparent.

In FIG. 5I, the lock assembly 500 is illustrated with a first half 155 of the outer stock body 154 only, to illustrate how the lock assembly 500 may slide relative to the outer stock body 154 (see also FIG. 1A). That is, a recess 139 (see e.g. FIG. 1C) may be provided in the lower stock assembly 300, such that a gap 198 may be remain between the rail(s) 132, 134 and corresponding rail(s) 199 in the first half 155 and/or second half (not illustrated in FIG. 5I) of the outer stock body 154, such that, while the tube assembly 200 does not experience a weakened rail interface, the lower stock assembly 300 may deflect if the firearm is slammed or fired, minimizing the potential for damage to the components of the stock assembly 100 and/or providing some additional recoil reduction as the nub 144 is compressed until the protrusion(s) 148 and/or a surface of the lock box 131 makes contact with an outer stock body 154 of the lower stock assembly 300. The size of the gap 198 may complement a desired compression distance of the nub 144 and/or spacing between the protrusion(s) 148 and the surface 156 to provide an evenly distributed stopping force for the outer stock body 154, such as through an evenly distributed stopping force for the first half 155 and/or second half of the outer stock body 154.

In FIG. 5J, a rear section view of the stock assembly is illustrated, demonstrating the interfaces between the lock box 131 and the outer tube 116 and the outer stock body 154, the details of which will be described below.

Turning to FIG. 6, and in light of the preceding figures, the lock box 131 is now described in further detail. The lock box 131 may have a first rail 132 and a second rail 134 for engaging the lower rail(s) 120 of the outer tube 116, while rails 164, 166 are shaped to engage the outer stock body 154 of the lower stock assembly 300. The pawls 136, 138 may be positioned to be pivotally coupled at passages or pin retaining feature(s) 176 in the lock box 131, as well as a corresponding passage 167 in the aft body 162 (see e.g. FIGS. 5F and 5H). The pawl stop(s) 178 may limit the pawls 136, 138 from rotating beyond a maximum and/or minimum distance by engaging pawl pin(s) 182 in the pawl(s) 136, 138. In some embodiments, the lock box 131 may be manufactured of aluminum, so as to provide a strong but light attachment point between the lower stock assembly 300 and the tube assembly 200.

In some embodiments, and with simultaneous reference to FIGS. 5J and 6, the first rail 132 and/or the second rail 134 and/or the corresponding lower rail(s) 120 in the outer tube 116 may be shaped such that the lock box 131 is limited to 1-dimensional travel when the rail(s) 132, 134 in the lock box 131 are engaged with the lower rail(s) 120 in the outer tube 116. For example, and without limitation, 1-dimensional travel may be achieved by providing an interface between the lock box 131 and the outer tube 116 that has a dovetail, t-slot, and/or sinusoidal curvature, such as to provide abutting surfaces that have varying normals. Causing the lock box 131 to engage the rail(s) 120 at surfaces that have varying normals effectively causes the lock box 131 to grip the rail(s) 120 from multiple directions and under varying load conditions in a manner that limits deformation of the rail(s) 120 and or lock box 131.

The recess 180 may provide the lock box 131 with a receiving space for components of the fore body 160 when the lock assembly 500 is brought into the compressed configuration.

Figure 7:
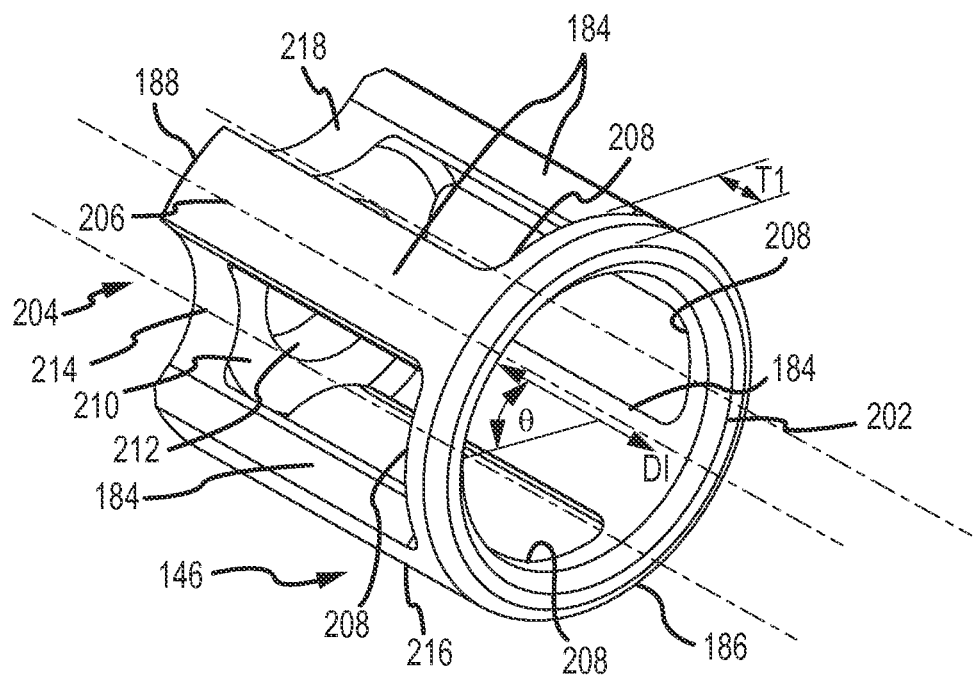
FIG. 7 is a perspective view of an exemplary Quick Disconnect (QD) socket.

Turning now to FIGS. 7-7I, the QD socket 146 is now described in further detail. The QD socket 146 may be an anti-rotational QD socket 146, and, instead of a common friction interface between the QD socket and the stock body, the QD socket 146, as illustrated, may include one or more braces 184 extending between a socket entry 186 and a socket base 188. The socket entry 186 may be formed to mate with known or standardized QD components, having, for example a generally cylindrical shape. The brace(s) 184, however, may be shaped to engage with one or more protrusions 192 (see FIG. 7A) in the outer stock body 154, to prevent the QD socket 146 from rotating within the outer stock body 154 and/or stripping the interior portions of the outer stock body 154. For the QD socket 146 to provide the ability to lock a QD device to the QD socket 146, the outer stock body 154 may have protrusions 192 that leave a gap 190 between the outer stock body 154 and/or the protrusions 192 and the QD entry 186 (see e.g. FIG. 7B). Providing a QD socket 146 as illustrated allows a lighter weight and/or less expensive material, such as a polymer, to be used, in contrast to currently-available friction interface designs which, by their nature, require the manufacturer use a stronger material, such as a metal, thereby increasing the weight and cost of the firearm. That is, the disclosed QD socket 146 may provide excellent wear characteristics and solid QD retention with a lighter construction.

Figure 7A:
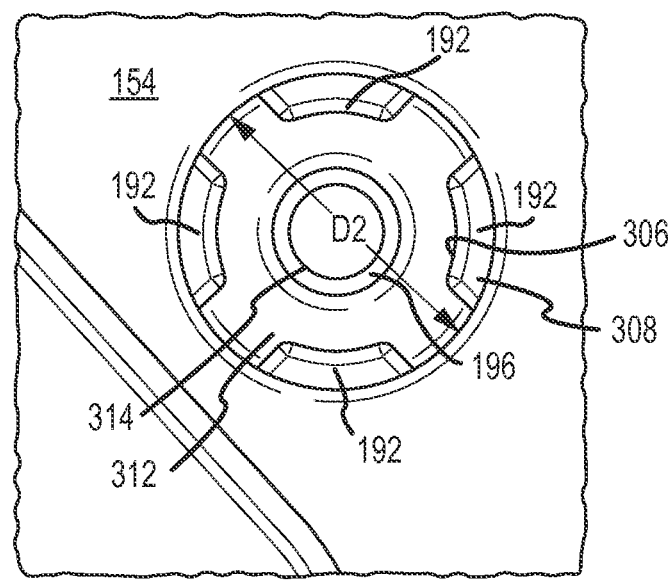
FIG. 7A is a side view of a stock body for interfacing with the QD socket in FIG. 7.
Figure 7B:
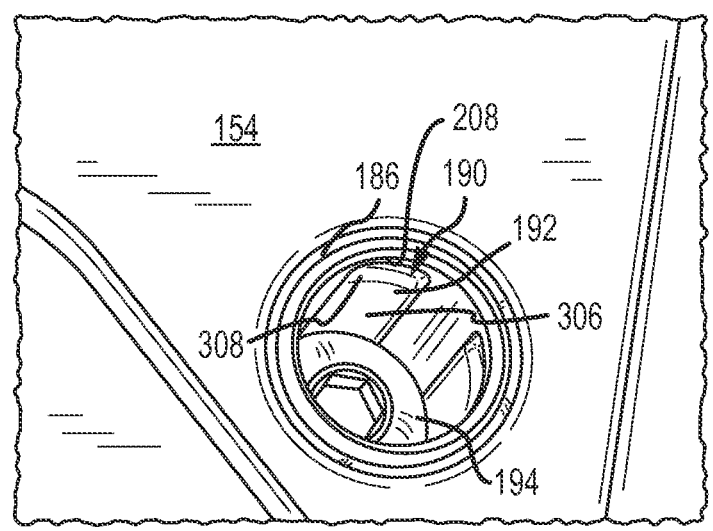
FIG. 7B is a perspective view of the QD socket in FIG. 7 and the stock body in FIG. 7A.
Figure 7C:
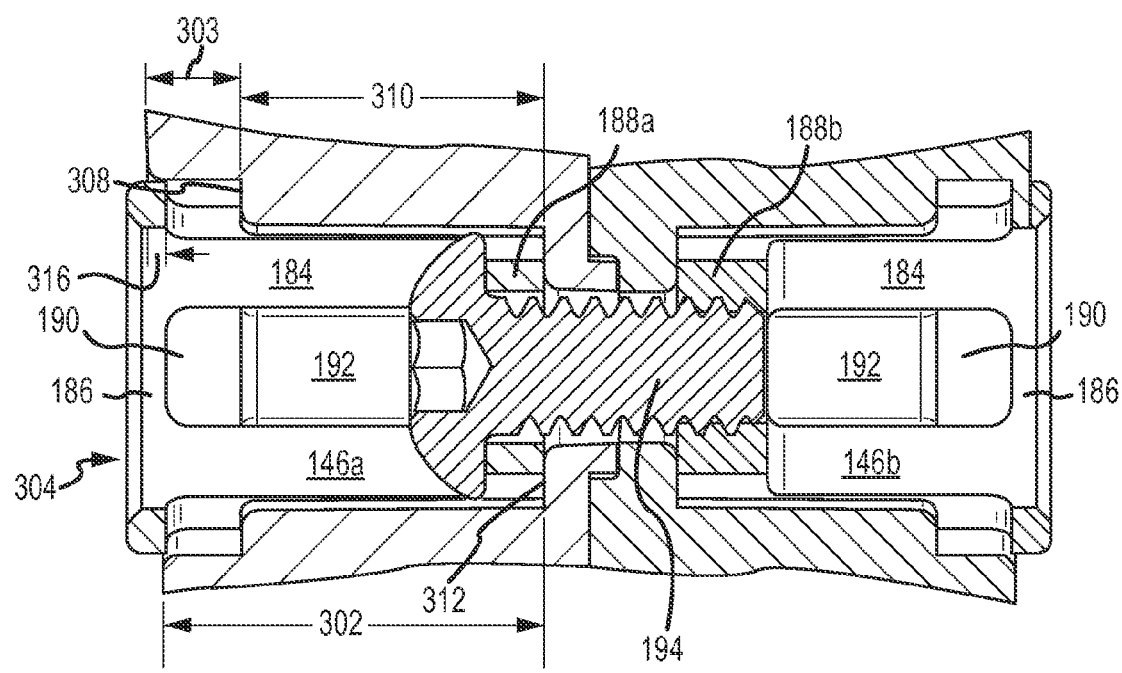
FIG. 7C is a cross-section view illustrating two opposing QD sockets in a firearm.

In some embodiments, the outer stock body 154, or surface to which the QD socket 146 should be attached, may include a through passage 196, such that an opposing interface may be attached on the other side, as seen in FIGS. 7A and 7C.

Continuing with FIG. 7-7B, the QD socket 146 may also be removable. For example, a fastener 194 may be used to removably fasten the QD socket 146 to the outer stock body 154 or any suitable location of the firearm or stock assembly 100.

Referring now to FIG. 7C, the fastener 194 may also connect a first QD socket 146a to a second or opposing QD socket 146b to the firearm or the outer stock body 154, as illustrated in FIG. 7C. In some embodiments, the first QD socket 146a may include a non-threaded socket base 188a, while the opposing QD socket 146b may include a threaded socket base 188b, to allow the two QD sockets 146a, 146b to be tightened towards one another by a fastener 194 without adding undesirable stresses to the assembly.

Returning now to FIG. 7-7H, some aspects of the QD socket 146, 246, 346 are described in further detail. As illustrated in FIG. 7, the socket 146, 246, 346 may have outer confines, that is, boundaries beyond which components of the socket 146, 246, 346 do not extend. In some embodiments, the outer confines may be cylindrical, as illustrated in FIG. 7 although other outer confines are contemplated, such as square as illustrated in FIG. 7H. It should be understood that any number of variations of the outer confines are contemplated. Where applicable, cylindrical outer confines may have an outer diameter D1, a proximal end 202 associated with an accessory interface side, a distal end 204, and a first brace 206 extending therebetween. The socket entry 186 may have a quick disconnect lip 208 (QD lip 208) on a distal side of the socket entry 186 to prevent a QD accessory from accidental removal from the socket 146.

The distal end 204 may have a socket base 188, 210 and a fastening means, such as a fastener passage 212 therethrough, to allow the socket 146, 246, 346 to be attached to a housing of a firearm, such as by using a fastener 194 (see e.g. FIG. 7C). The socket base 188 may have a peripheral region, a radial region and/or an outer confines region that is approaching the outer confines of the socket 146, 246, 346, 446. The peripheral, radial or outer confines region may have one or more recesses, such as a first recess 214 as illustrated in FIG. 7 and FIG. 7H.

In some embodiments, the first brace 206 is positioned at a first radial position, and the first recess 214 is positioned at a second radial position, with the second radial position being different from the first radial position. That is, the first recess 214 may be rotated by a given angle θ from first brace 206. The first recess 214 and the first brace 206 may be shaped to slidingly engage a first protrusion 192 in a socket mounting recess of a housing body 154, 354, 454 (see e.g. FIGS. 7A-7C, 7E, and 7G).

Figure 7D:
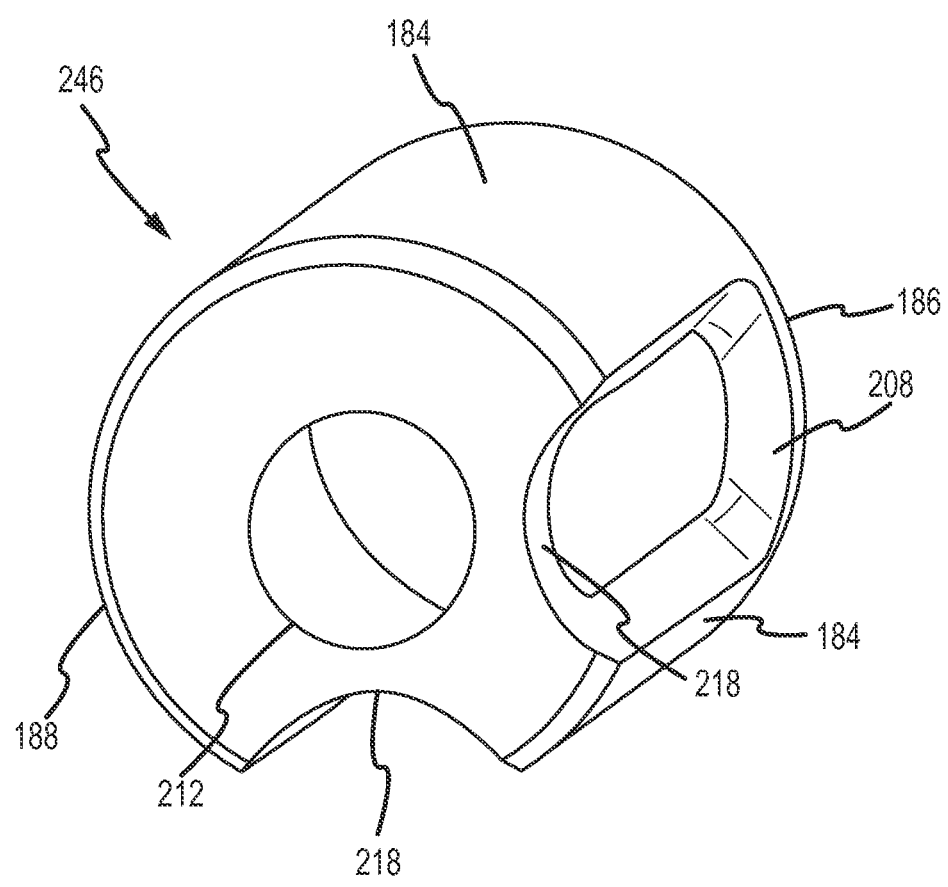
FIG. 7D is a rear perspective view of another exemplary QD socket.
Figure 7E:
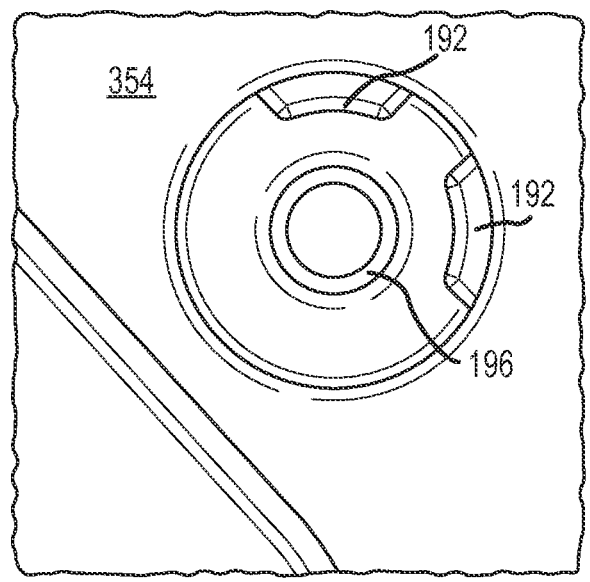
FIG. 7E is a side view of a stock body for interfacing with the QD socket in FIG. 7D.
Figure 7F:
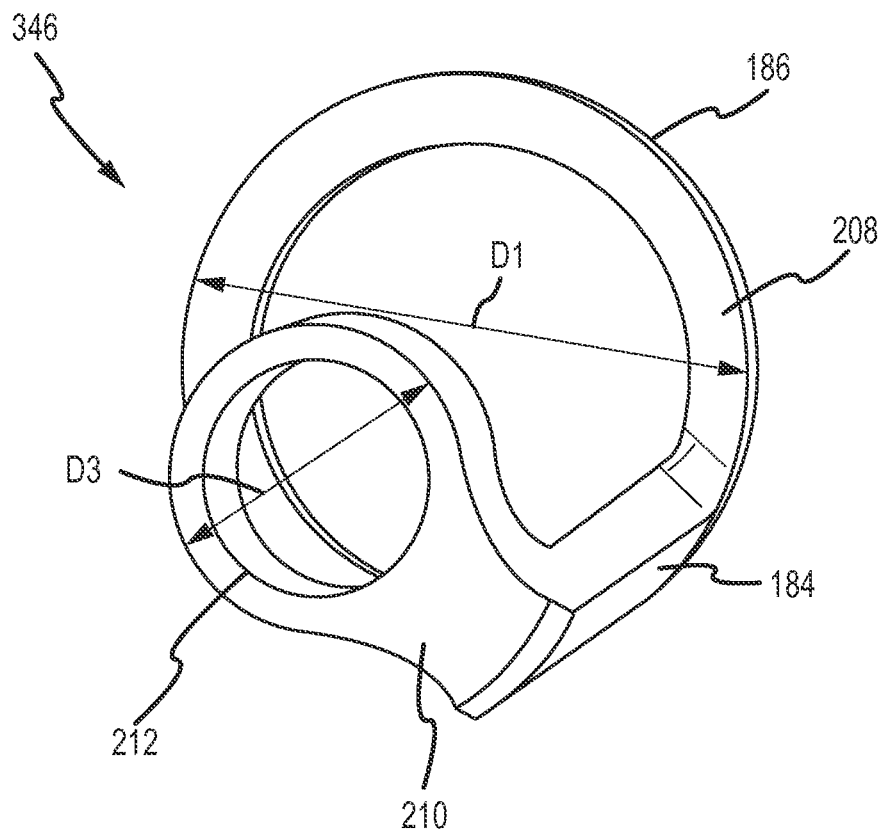
FIG. 7F is a rear perspective view of another exemplary QD socket.
Figure 7G:
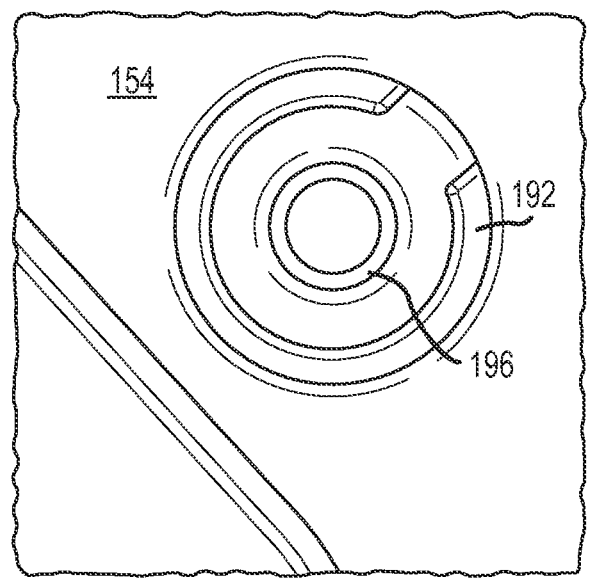
FIG. 7G is a side view of a stock body for interfacing with the QD socket in FIG. 7F.
Figure 7H:
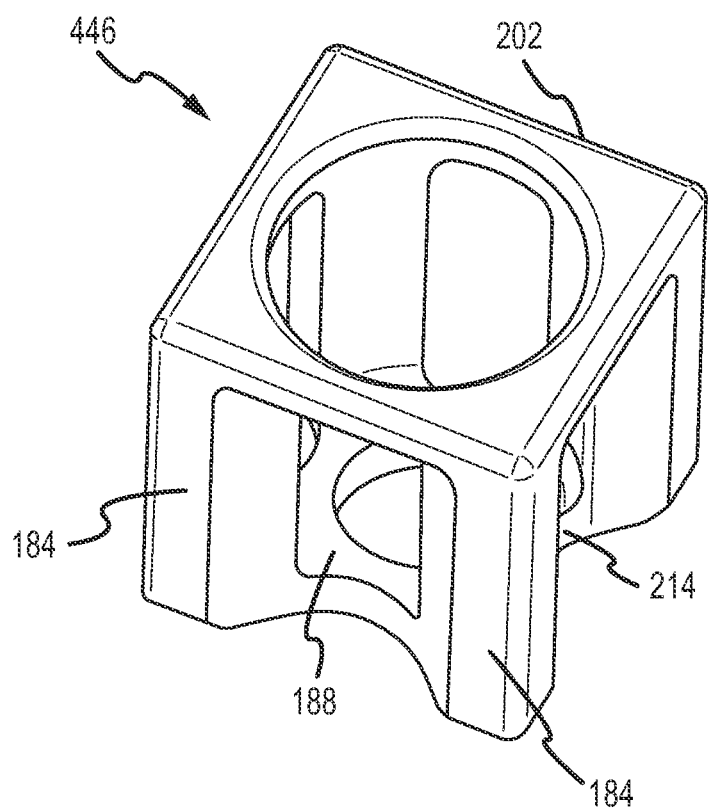
FIG. 7H is a perspective view of another exemplary QD socket.
Figure 71:
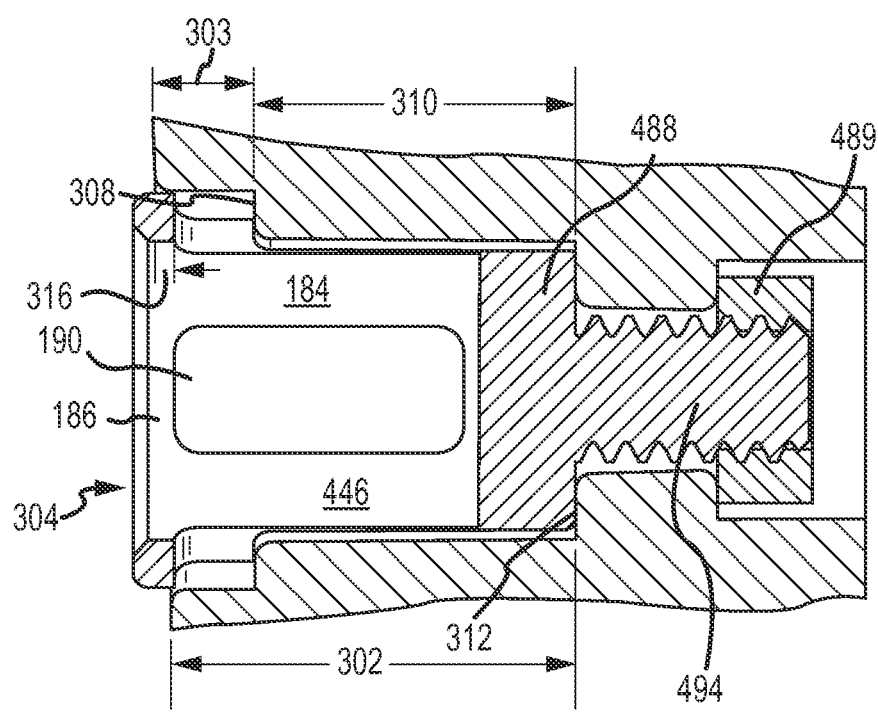

A second brace 216 or more, such as two to four braces 184, may extend between the proximal and distal ends of the socket 146, and, as illustrated in FIG. 7D, the braces 184 need not be identical in size. Moreover, as illustrated in FIGS. 7F and 7G, the socket 146 may function with a first brace 184 only. The socket 346 may also function without any recesses in the socket base 210, as illustrated in FIG. 7F.

Continuing with FIG. 7, a second recess 218 may be provided at a third radial position, the third radial position different from the second radial position and the first radial position. It should be understood that the second recess 218 may be in embodiments having just one brace 184. For example, by retaining the base 188 and omitting one of the braces 184 extending between the base 188 and the socket entry 186 illustrated in FIG. 7D, one may provide a socket with a single brace 184 and two or more recesses 218. A recess 214, 218 between each brace 184 may be provided, thereby providing a maximized resistance to rotation of the socket 146 within the recess of the body 154.

Continuing with FIGS. 7-7I, a housing for a firearm may be provided to receive the socket. The housing may include a body 154, 354, 454 having a wall with a recess shaped therein. The recess may have cylindrical outer confines having a first diameter D2 and a first depth 302. The recess may have a first protrusion 192 extending inwardly from the cylindrical outer confines, with the first protrusion 192 having a length 310 that is less than the first depth 302 of the cylindrical outer confines. The proximal entry 304 may be a cylindrical recess having the first diameter D2 and a second depth 303 extending to a proximal surface 308 of the first protrusion 192, 306 (see e.g. FIGS. 7B, 7G). The distal surface 312 is shaped to seat a socket base 188, 210 of the QD socket 146, 246, 346 and comprises a receiving means, which may be a fastener passage 314 or in some embodiments a blind hole or any other receiving means for permanently or removably attaching a socket 146, 246, 346, 446.

With specific reference to FIG. 7C, the proximal entry 304 of the recess may have a second depth 303 that is greater than a depth of engagement 316 between a socket entry 188 of the QD socket 146, 246, 346 and the recess. By providing a proximal entry 304 having a depth 303 that is greater than the depth of engagement 316, a gap 190 between the QD lip 208 and the protrusion(s) 192 results (see e.g. FIGS. 7B, 7C, 7I) so that a detent in a QD accessory mount may extend into the gap 190. The braces 184 may assist in preventing the QD accessory mount from rotating or tilting within the socket 146. It should be understood that the gap 190 may be limited to the regions proximal of the recesses 218. In some embodiments, a gap 190 may extend between the QD lip 208 and the socket base 188 in some regions, and between the QD lip 208 and the protrusions 192 in other regions, as can be understood from FIGS. 7D-7E.

As illustrated in FIGS. 7F-7G, a socket 346 that has no recesses in the socket base 188 may be used with a recess in a body 454 that has a single oversized protrusion 192. This is achieved by providing a socket base 188 that has a generally disc shape with a diameter D3 that is smaller than the diameter D1 of the outer confines and a first brace 184 extending therefrom.

Turning now to FIG. 7I, shown is an exemplary anti-rotational QD socket 446. As illustrated, it should be understood that the anti-rotational QD socket 446 may have a base 488 that, instead of a fastener passage as previously described, has another fastening means 494, such as a threaded bolt portion 494 that is unitary with or coupled to the base 488 for passing through a wall and having a nut 489 on an opposing side of the wall to retain the QD socket 446 coupled to the wall.

Moreover, although the QD socket has been described using at least two fastening means for coupling the QD socket 446 to a firearm housing or a wall of a device, those skilled in the art will readily appreciate that any number of fastening means 494 are envisioned, including, but not limited to, external threads barbs, lugs, pins, detents, magnets, etc., and the fastening means 494 are expressly defined herein as any suitable fastener to maintain the QD socket 146, 246, 346, 446 affixed to a wall of a device or a firearm housing.

Figure 8:
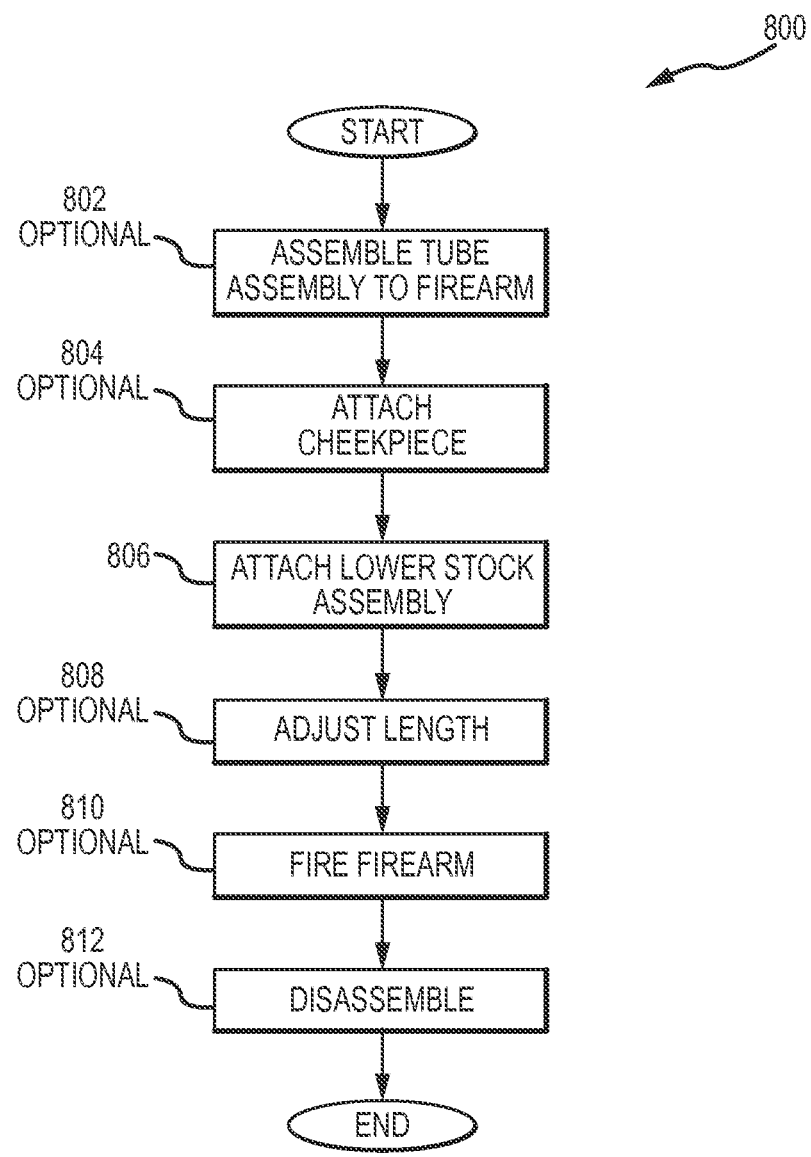
FIG. 8 is a flowchart of a method of using a firearm.

Turning now to FIG. 8, a method 800 of using a stock assembly for a firearm is now described. The method 800 may include one or more of assembling 802 a tube assembly to a firearm, attaching 804 a cheek piece to the tube assembly, attaching 806 a lower stock assembly to the tube assembly, adjusting 808 an overall length of the stock assembly, firing 810 the firearm, and disassembling 812 the lower stock assembly from the tube assembly.

Assembling 802 a tube assembly to a firearm may include threading a firearm interface of a receiver extension into a threaded socket of the firearm, sliding an end plate over the receiver extension, sliding an outer tube around the receiver extension, and threading a nut onto the receiver extension. The end plate may be used to align the outer tube to a desired orientation relative to the receiver socket. Assembling 802 a tube assembly to a firearm may be achieved using one or more embodiments of the tube assembly 200 previously described or illustrated in this document.

Attaching 804 a cheek piece to the tube assembly may include causing a rail or rails of a cheek piece to slide onto a rail or rails in the outer tube of the tube assembly. Attaching 804 a cheek piece may be such that the cheek piece is stationary relative to the tube assembly, including when the lower stock assembly is adjusted relative to the tube assembly. Attaching 804 a cheek piece may be achieved using one or more embodiments of the cheek piece 108 or tube assembly 200 previously described in this document with reference to FIGS. 1-7C.

Attaching 806 a lower stock assembly to the tube assembly may include sliding a rail of a lower stock assembly onto a rail of an outer tube in the tube assembly, and allowing one or more spring-biased pawls in the stock assembly to engage one or more teeth in the outer tube. Attaching 806 may be achieved using the lower stock assembly 300 and the tube assembly 200 previously described or illustrated elsewhere in this document, with or without the cheek piece and/or the storage compartment 121.

Adjusting 808 an overall length of the stock assembly may include causing the pawl(s) to disengage from the one or more teeth, and pushing or pulling the lower stock assembly along the rail(s) in the outer tube to a desired position relative to the tube assembly. Causing the pawl(s) to disengage may include pulling on a first release mechanism to cause a lock assembly in the lower stock assembly to compress, thereby forcibly moving the pawl(s) out of engagement with the tooth. With the pawl(s) out of engagement, adjusting 808 may include pushing or pulling the lower stock assembly relative to the tube assembly. Adjusting 808 an overall length may be achieved using embodiments of the stock assembly 100 previously described or illustrated in this document.

Disassembling 812 the lower stock assembly from the outer tube assembly may include compressing a release member against a fore body in the lower stock assembly while simultaneously pulling on the first release mechanism, thereby causing a surface in the release member to move out of or avoid engagement with a stop surface, allowing a user to compress the fore body further and force the pawl(s) to disengage from or avoid engagement with a safe tooth in the tube assembly as the lower stock assembly is translated off of the tube assembly. Disassembling 812 may be achieved using embodiments of the stock assembly previously described or illustrated in this document.

Figure 9:
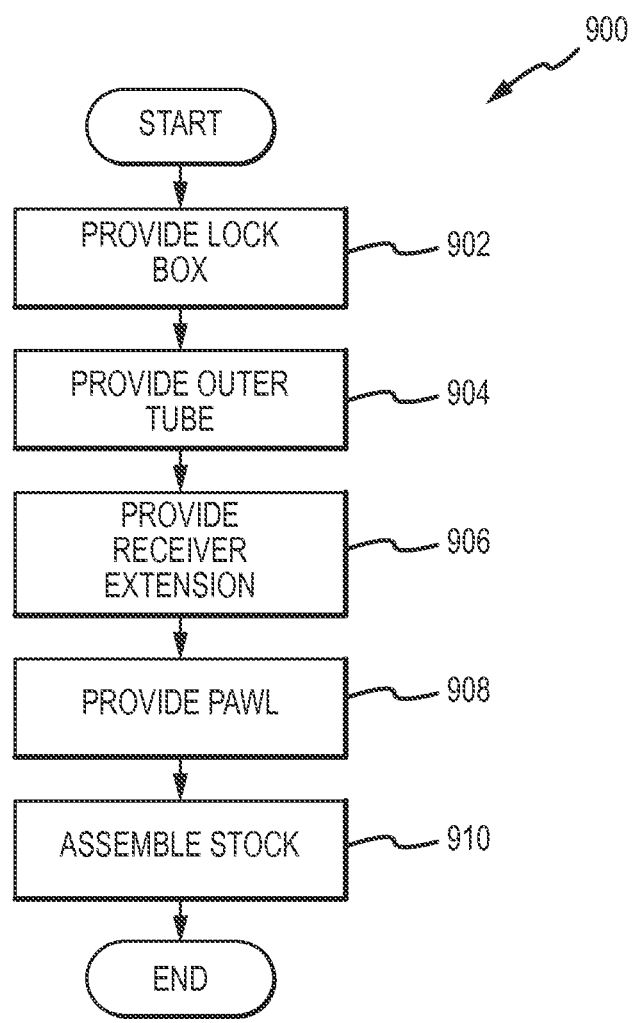
FIG. 9 is a flowchart of a method of making a stock assembly for a firearm.

Turning now to FIG. 9, a method 900 of making a stock assembly for a firearm is now described. The method 900 may include providing 902 a lock box, providing 904 an outer tube, providing 906 a receiver extension, providing 908 a pawl, and assembling 910 a stock assembly.

Providing a lock box 902 may include providing a lock box substantially as previously illustrated or described in this document. The lock box may be aluminum, and have upper and lower rails for receiving an outer body of a stock assembly, and inwardly-protruding rails for engaging rails in a tube assembly. The lock box may include a point for pivotally attaching one or more pawls, and a rotation limiter. Providing a lock box 902 may include providing a lock box machined and/or pressed from an extruded blank.

Providing an outer tube 904 may include providing an outer tube substantially as previously illustrated or described in this document. The outer tube may be aluminum and include a plurality of teeth, including at least one positioning tooth and at least one safe tooth, the safe tooth extending further from a main body of the outer tube than the positioning tooth. Providing an outer tube 904 may include providing an outer tube machined from an extruded tube.

Providing a receiver extension 906 may include providing a receiver extension substantially as previously illustrated or described in this document. The receiver extension may include a shoulder and a threaded distal end, and a threaded proximal end. The receiver extension may be aluminum. Providing a receiver extension 906 may include providing a receiver extension machined from an extruded tube.

Providing a pawl 908 may include providing a pawl substantially as previously illustrated or described in this document. The pawl may be made of steel, any other metal or other suitably strong material now known or as yet to be developed. The pawl may be made of a material that is harder than the material that makes up the receiver extension and/or outer tube and or lock box. Providing a pawl may include providing a pawl that is stamped, machined, and/or hardened from a blank.

Assembling the stock assembly 910 may include assembling a stock assembly 100 as previously herein described.

In another aspect, a method of making a firearm is disclosed, and includes making a stock assembly for a firearm 900 as previously herein described and assembling the stock assembly 100 to a firearm as previously herein described.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An anti-rotational quick disconnect socket for a firearm, the socket comprising:
   a proximal end and a distal end, and a first brace extending between the proximal end and the distal end; wherein
   the proximal end comprises a socket entry and a quick disconnect lip;
   the distal end comprises a socket base having a fastening and a radial region having a first recess;
   the first recess and the first brace are shaped to slidingly engage a first protrusion in a socket mounting recess of a firearm wall; and
   the socket base is shaped to clear the first protrusion as the quick disconnect socket is placed in the socket mounting recess of the firearm.

2. The socket of claim 1, further comprising:
   a second brace extending between the proximal end and the distal end.

3. The socket of claim 1, further comprising:
   a second recess at a third radial position, the third radial position different from the second radial position and the first radial position.

4. The socket of claim 1, further comprising:
   a second brace extending between the proximal end and the distal end; and
   a second recess; wherein
   the first brace, the second brace, and the first recess are shaped to slidingly engage a first protrusion in a socket mounting recess of a firearm wall; and
   the first brace and the second recess are shaped to slidingly engage a second protrusion in the socket mounting recess.

5. The socket of claim 4, wherein:
   the second brace is shaped to slidingly engage the second protrusion.

6. The socket of claim 1, wherein:
   the socket is made of a metallic material.

7. An anti-rotational quick disconnect socket system for a firearm, the system comprising:
   an anti-rotational quick disconnect socket, the socket comprising a proximal end, a distal end comprising a socket base having a fastening device, and a first brace extending therebetween, the proximal end having a socket entry with a quick disconnect lip; and
   a socket mounting recess in a housing of a firearm shaped to slidingly receive and seat the socket, the recess comprising a first depth extending to a distal surface, and a first protrusion extending inwardly from outer confines of the recess; wherein
   the first protrusion is engaged with the first brace and the first recess of the socket, to prevent rotation of the socket relative to the recess;
   the first protrusion and the socket base are shaped to allow the socket base to clear the first protrusion as the socket is placed in the socket mounting recess; and
   the system comprises a gap between a proximal surface of the first protrusion and a distal surface of the socket entry.

8. The system of claim 7, further comprising:
   a fastener receiving device in the recess, whereby the socket is coupled to the recess.

9. The system of claim 8, wherein:
   the fastening device and the fastener receiving device comprise a fastener extending through a fastener passage in the socket and a fastener passage in an opposing quick disconnect socket.

10. The system of claim 9, wherein:
    the opposing quick disconnect socket is an anti-rotational quick disconnect socket or a conventional quick disconnect socket.

11. The system of claim 7, further comprising:
    a second brace extending between the proximal end and the distal end of the socket; wherein
    the first brace and the second brace are shaped to slidingly engage the first protrusion.

12. The system of claim 7, wherein:
    the gap is shaped to receive a detent in a quick detach mounting accessory.

13. The system of claim 7, wherein:
    the socket comprises a second brace, a third brace, and a fourth brace, each of the second, third, and fourth braces extending between the proximal end and the distal end of the socket; and
    the recess in the housing of the firearm comprises a second protrusion, a third protrusion, and a fourth protrusion, each of the second, third, and fourth protrusions extending inwardly from the outer confines of the recess; wherein
    each of the first, second, third, and fourth protrusions are engaged with respective ones of the first, second, third, and fourth braces to prevent rotation of the socket relative to the recess; and
    the system comprises a gap between a proximal surface of each of the second, third, and fourth protrusions and the distal surface of the socket entry.

* * * * *